(12) United States Patent
Nakamura et al.

(10) Patent No.: US 7,953,939 B2
(45) Date of Patent: May 31, 2011

(54) STORAGE SYSTEM AND METHOD OF CONTROLLING A STORAGE SYSTEM

(75) Inventors: Shuji Nakamura, Machida (JP); Katsuya Tanaka, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 513 days.

(21) Appl. No.: 12/003,902

(22) Filed: Jan. 3, 2008

(65) Prior Publication Data

US 2008/0172525 A1 Jul. 17, 2008

(30) Foreign Application Priority Data

Jan. 15, 2007 (JP) ................................. 2007-005652

(51) Int. Cl.
G06F 12/00 (2006.01)
G06F 13/00 (2006.01)
G06F 13/28 (2006.01)

(52) U.S. Cl. . 711/154; 711/112; 711/113; 711/E12.001; 711/E12.019

(58) Field of Classification Search ................. 711/112, 711/113, 154, E12.001, E12.019
See application file for complete search history.

(56) References Cited

U.S. PATENT DOCUMENTS

| | | | | |
|---|---|---|---|---|
| 5,606,706 | A * | 2/1997 | Takamoto et al. | 711/100 |
| 6,266,753 | B1 * | 7/2001 | Hicok et al. | 711/202 |
| 6,442,659 | B1 * | 8/2002 | Blumenau | 711/162 |
| 6,625,750 | B1 * | 9/2003 | Duso et al. | 714/11 |
| 7,386,754 | B2 * | 6/2008 | Cronch | 714/5 |
| 2002/0118307 | A1 * | 8/2002 | Lee | 348/714 |
| 2005/0050401 | A1 * | 3/2005 | Matsuki et al. | 714/42 |
| 2006/0002555 | A1 * | 1/2006 | Lekatsas et al. | 380/269 |
| 2006/0075190 | A1 * | 4/2006 | Higaki et al. | 711/114 |
| 2006/0136365 | A1 | 6/2006 | Kedem et al. | |
| 2006/0174150 | A1 * | 8/2006 | Nakano et al. | 713/330 |
| 2006/0184505 | A1 | 8/2006 | Kedem et al. | |
| 2006/0190643 | A1 | 8/2006 | Kedem et al. | |
| 2006/0230014 | A1 | 10/2006 | Kedem et al. | |
| 2007/0076961 | A1 * | 4/2007 | Shiiyama | 382/232 |
| 2008/0055323 | A1 * | 3/2008 | Franaszek et al. | 345/530 |
| 2008/0154928 | A1 * | 6/2008 | Bashyam et al. | 707/101 |
| 2010/0306498 | A1 * | 12/2010 | Shiga | 711/203 |

FOREIGN PATENT DOCUMENTS

| JP | 05-073213 | 9/1991 |
|---|---|---|
| JP | 2002-297320 | 3/2001 |

* cited by examiner

*Primary Examiner* — Sheng-Jen Tsai
(74) *Attorney, Agent, or Firm* — Foley & Lardner LLP

(57) ABSTRACT

A storage system includes a plurality of disk drives, and a disk controller for controlling the plurality of disk drives. The plurality of disk drives are configured from a plurality of virtual devices, to which logical devices are allocated. The disk controller apparatus comprises a channel adapter connected to the host computer, a disk adapter for accessing predetermined storage regions of the logical devices, cache memory arranged between the channel adapter and the disk adapter, a compression unit for carrying out compression processing on the data, and a power controller for controlling supplying of power to the plurality of disk drives. The disk controller forms logical devices after compression based on data compressed by the compression processing, and the logical devices after compression are allocated to the virtual devices.

19 Claims, 22 Drawing Sheets

FIG.5

LDEV-VDEV ALLOCATION TABLE 500

| LDEV# | LBA | | COMPRESSION STATE | VDEV | | DATA LENGTH | DATA LENGTH AFTER COMPRESSION |
|---|---|---|---|---|---|---|---|
| | LBA_start | LBA_end | | # | LBA_start | | |
| 000 | 00000000 | 0000FFFF | 0 | 0 | 00000 | 10000 | 8102 |
| 000 | 00010000 | 0001FFFF | 0 | 0 | 10000 | 10000 | 4034 |
| : | : | : | : | : | : | : | : |
| 3 | 00010000 | 0001FFF | 0 | 8 | 05200 | 4B00 | 4820 |
| 3 | 00020000 | 0002FFFF | 1 | 8 | 09D00 | 8600 | 8238 |
| : | : | : | : | : | : | : | : |

LDEV MANAGEMENT TABLE    600

| LDEV | COMPRESSION MODE | ACCESS FREQUENCY | LOGICAL STORAGE CAPACITY | ESTIMATED CAPACITY AFTER COMPRESSION |
|---|---|---|---|---|
| 0 | COMPRESSION (AUTOMATIC) | 1,260 | 146 GB | 12 GB |
| 1 | NO COMPRESSION (AUTOMATIC) | 342,334 | 9.76 GB | 4 GB |
| 2 | COMPRESSION (INSTRUCTED) | 122 | 269 GB | 23 GB |
| 3 | NO COMPRESSION (INSTRUCTED) | 2,260 | 1090 GB | 980 GB |
| 4 | NO COMPRESSION (INSTRUCTED) | 223,323 | 148 GB | 80 GB |
| : | : | : | : | : |

LU-LDEV MANAGEMENT TABLE 700

| HOST ID | LU# | LDEV # |
|---|---|---|
| 123.45.67.78 | 0 | 0 |
| | 1 | 23 |
| : | : | : |
| 223.45.67.78 | 12 | 223 |
| | 13 | 0 |

TABLE FOR VDEV USE

| | Segment 000 | Segment 008 | Segment 010 | | NUMBER OF EMPTY SEGMENTS 1002 |
|---|---|---|---|---|---|
| 0 | | | | ... | 101 |
| 1 | | | | ... | 120 |
| 2 | | | | ... | 80 |
| 3 | | | | ... | 73 |
| ... | | | | ... | ... |

| LDEV | COMPRESSION MODE | COMPRESSION STATE | ACCESS FREQUENCY | LOGICAL STORAGE CAPACITY | ESTIMATED CAPACITY AFTER COMPRESSION |
|---|---|---|---|---|---|
| 0 | AUTOMATIC ▽ | UNCOMPRESSED | 1,260 IOPS | 146 GB | 12 GB |
| : | : | : | : | 9.76 GB | : |
| 3 | NONE ▽ | UNCOMPRESSED | 2,260 IOPS | 1090 GB | 980 GB |
| : | : | : | : | : | : |
| 9 | COMPRESSION ▽ | COMPRESSED | 24 IOPS | 165 GB | |
| : | : | : | : | : | : |

( CONFIGURATION OPTIMIZATION )

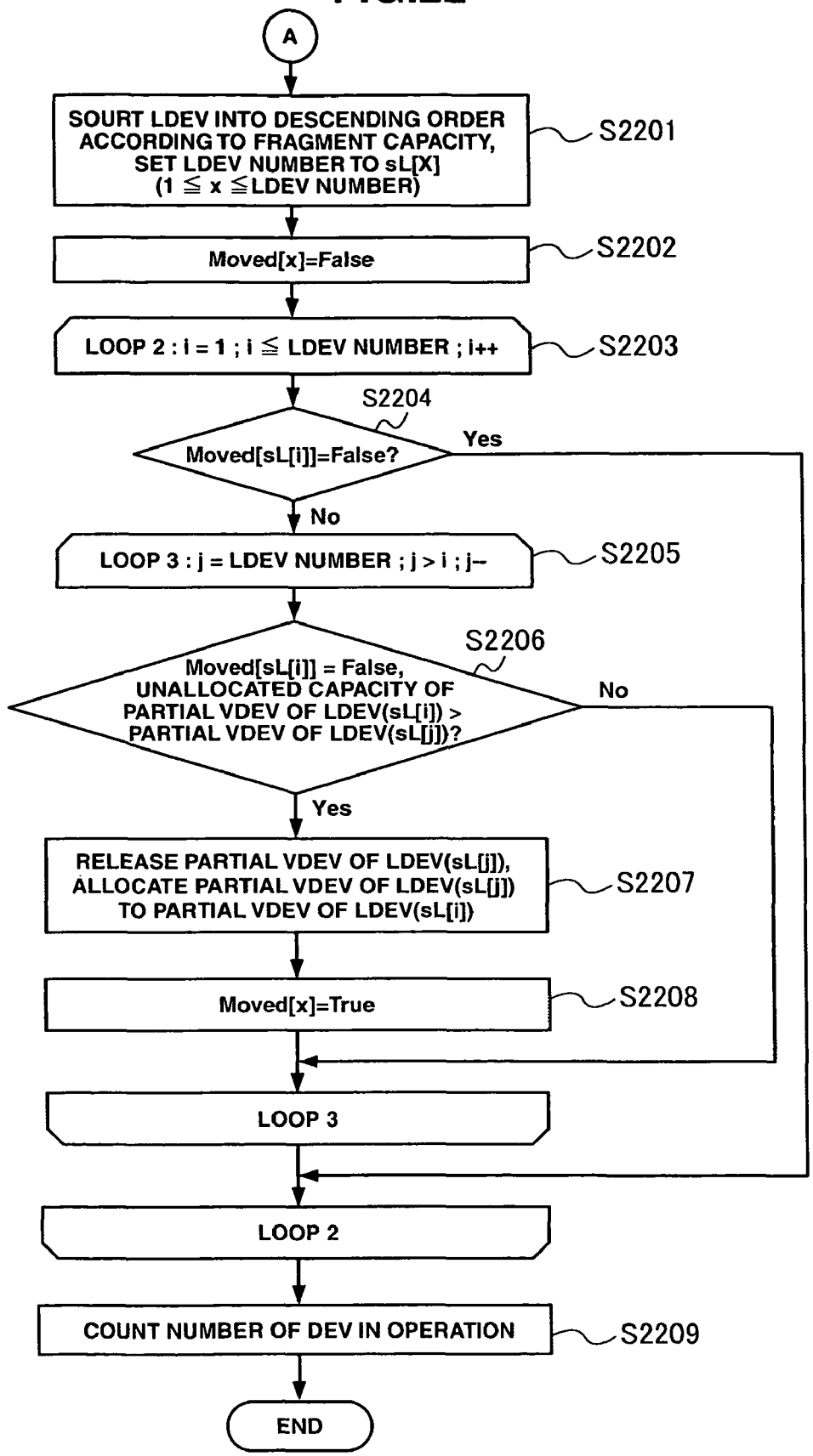

STORAGE SYSTEM AND METHOD OF CONTROLLING A STORAGE SYSTEM

CROSS-REFERENCES TO RELATED APPLICATIONS

This application relates to and claims priority from Japanese Patent Application No. 2007-005652, filed on Jan. 15, 2007, the entire disclosure of which is incorporated herein by reference.

BACKGROUND

1. Field of the Invention

The present invention relates to a storage system and a method of controlling a storage system, and particularly relates to low power consumption control technology for a plurality of disk drives of a storage system.

2. Description of Related Art

The increase in scale of data centers presents problems with regards to increases in power consumed by systems and heat emitted by systems. As a result, a storage system is demanded that is capable of consuming little power, and is capable of storing large volumes of data in an effective manner.

Technology for suppressing power consumption of a storage apparatus is disclosed in patent document 1 listed below. The storage apparatus in patent document 1 suppresses power consumption by stopping the supply of power to some hard disk drives (HDD) when load information based on access requests from a host computer falls below a threshold value.

Further, technology for compressing and storing data in a storage apparatus is disclosed in patent document 2 listed below.

However, with data compression technology, it is difficult predict the size of data that is compressed up to the actual execution of compression processing on the data. In addition, there is also the possibility, depending on the data, of the size of the data being larger than that for before the application of compression processing.

[Patent Document 1]
Japanese Patent Laid-open Publication No. 2002-297320.
[Patent Document 2]
Japanese Patent Laid-open Publication No. H05-73213.

With technology such as disclosed in patent document 1 where consumption of power is suppressed by stopping supply of electricity to hard disk drives, in the case of accessing a hard disk that has been spun down as a result of a controller stopping the supply of power, it is necessary to wait until the hard disk has been spun up again. Typically, a few seconds to a few tens of seconds are required to spin up a hard disk. As a result, in the event of accessing a spun down hard disk drive, access latency increases dramatically, and there is the fear that this may cause the system to go down.

Further, the storage apparatus disclosed in patent document 2 discloses technology for compressing and storing data but does not refer to the point of suppressing power consumed.

On the other hand, even in the case of using storage apparatus of the same power consumption performance, if a larger volume of data is stored per one storage apparatus, the desired data capacity can be stored using a smaller number of apparatus, which as a result contributes to low power consumption.

SUMMARY

In order to resolve the above problems, an object of the present invention is to provide a low power consumption storage system for storing data in a highly reliable and effective manner with a high degree of reliability.

Namely, according to an aspect of the present invention, in a storage system having a plurality of disk drives and a disk controller for controlling the plurality of disk drives, the plurality of disc drives are configured from a plurality of virtual devices, and logical devices are allocated to the plurality of virtual devices. The disk controller is comprised of a channel adapter connectable to a host computer via a channel, a disk adapter capable of accessing a predetermined storage region of the logical device, cache memory arranged for transmitting and receiving data between the channel adapter and the disk adapter, a compression unit for carrying out compression processing on the data, and a power control unit for controlling power supplied to the plurality of disk drives. The disk controller forms the logical device after compression based on data compressed as a result of the compression processing, and allocates the logical device after compression to at least one of the plurality of virtual devices. The disk controller also controls the power control units in such a manner that power is controlled for virtual devices that are not allocated with logical devices after compression.

Further, according to another aspect of the present invention, a storage system control method having a plurality of disk drives and a disk controller for controlling the plurality of disk drives, comprises the steps of configuring a plurality of virtual devices allocated with at least one disk drive, allocating logical devices for before compression for supplying regions for storing data to the host computer to first virtual devices configured using a first predetermined number, receiving data in accordance with write requests from the host computer, subjecting the received data to compression processing, allocating logical devices for after compression formed based on data compressed by the compression processing to second virtual devices configured from a second predetermined number lower than the first predetermined number, and controlling the supply of power to virtual devices other than the second virtual devices configured using the second predetermined number.

Moreover, according to another aspect of the present invention, a storage system control method having a plurality of disk drives and a disk controller for controlling the plurality of disk drives, comprises the steps of configuring a plurality of virtual devices allocated with at least one disk drive, allocating logical devices for before compression for supplying storage regions for data to the host computer to a virtual device configured from a first predetermined number, reading out data stored in the first logical device, subjecting the read data to compression processing, allocating logical devices for after compression formed based on data compressed by the compression processing to virtual devices configured from a second predetermined number lower than the first predetermined number, and controlling the supply of power to virtual devices other than the virtual devices configured using the second predetermined number.

According to a typical embodiment of the present invention, it is possible to reduce power consumption without causing extreme deterioration in performance. Further, data compression can be carried out so that data can be stored in an effective manner.

Other aspects and advantages of the invention will be apparent from the following description and the appended claims.

BRIEF DESCRIPTION OF THE DRAWINGS

FIG. 5 shows an example of an LDEV-VDEV allocation table of the storage system of an embodiment of the present invention;

FIG. 6 is shows an example of an LDEV management table of the storage system of an embodiment of the present invention;

FIG. 7 shows an example of an LU-LDEV management table of the storage system of an embodiment of the present invention;

FIG. 10 shows an example of a table for usage of a virtual device VDEV of the storage system of an embodiment of the present invention;

FIG. 18 illustrates an example of a screen on the management terminal of an embodiment of the present invention;

FIG. 22 is a flowchart illustrating configuration optimization processing of the storage system of an embodiment of the present invention;

DETAILED DESCRIPTION OF PREFERRED EMBODIMENTS

The following is a description with reference to the drawings of one or more embodiments of the present invention.

Figure 1:
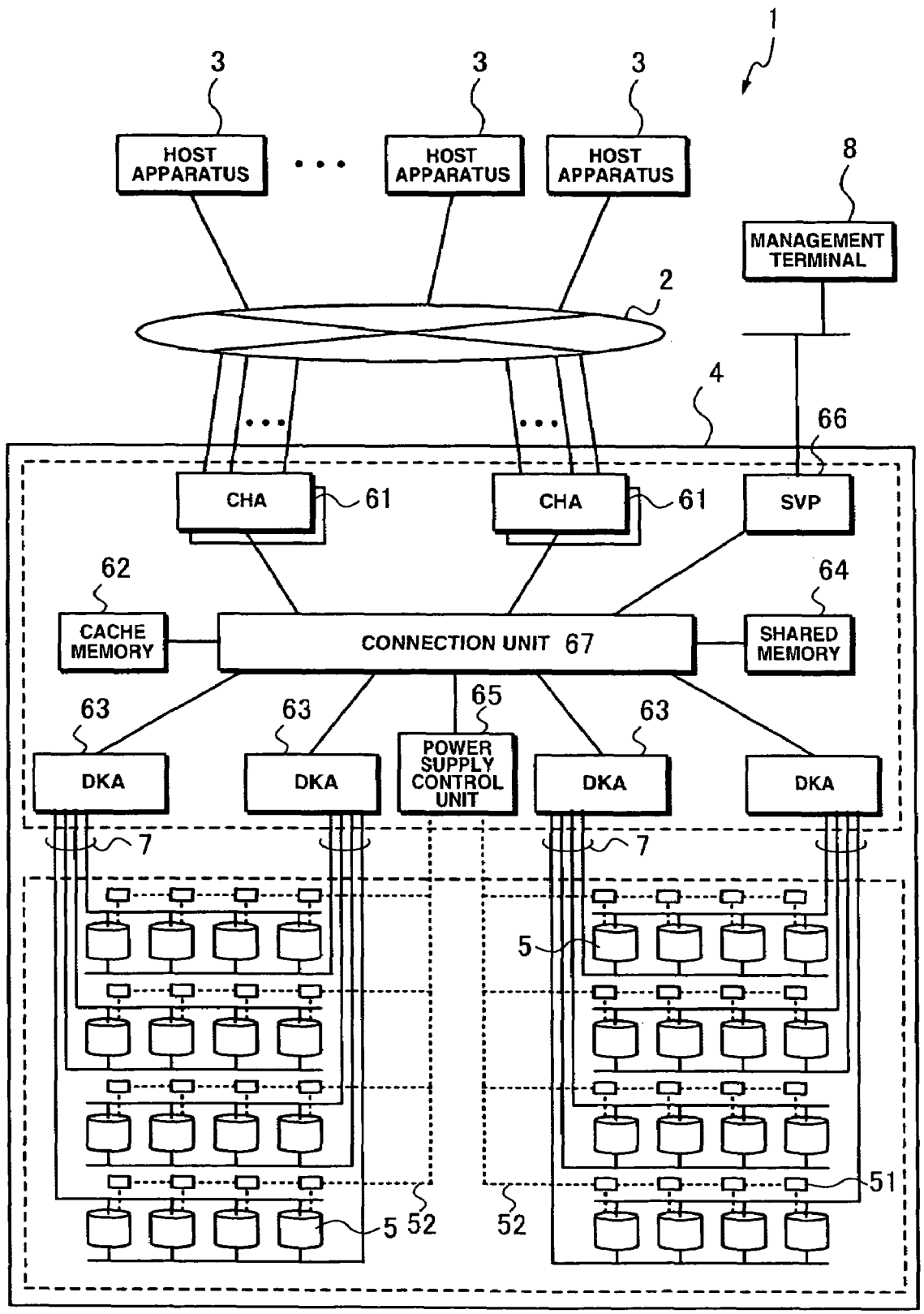
FIG. 1 is a block diagram showing a configuration for a computer system of an embodiment of the present invention.

FIG. 1 is a block diagram showing a configuration for a computer system 1 of an embodiment according to the present invention. As shown in FIG. 1, the computer system 1 includes a host computer 3 and storage system 4 operatively connected to a network 2, and, for example, constitutes a business system for a bank, or a seat reservation system for an airline, etc.

The network 2 may be, for example, a SAN (Storage Area Network), LAN (Local Area Network), or the Internet, and is configured to includes network switches and hubs, etc. Further, a peer-to-peer connection may also be adopted in the case of connection using a SCSI (Small Computer System Interface) interface. In this embodiment, the network 2 may be configured from a SAN (FC-SAN) using Fibre Channel protocol.

The host computer 3 is, for example, a computer at the core of a business system for a bank or a seating reservation system for an airline etc. Specifically, the host computer 3 is equipped with hardware resources (not shown) such as a processor, main memory, communication interface, and direct-connection input/output (I/O) apparatus etc., and is also provided with software resources such as a device driver or operating system (OS), and application program, etc. As a result, the host computer 3 executes each program under the control of the processor, and implements desired operation through acting cooperatively with hardware resources. For example, the host computer 3 implements the business system described above in combination with a storage system 4 described below by executing a business application program on an OS under the control of a processor.

The storage system 4 comprises a plurality of disk drives 5, and disk controller 6 for controlling I/O accesses of writing to or reading from the disk drives 5. The disk drives 5 and the disk controller 6 are operatively connected via a disk channel 7 so as to exchange data. The disk channel 7 can use, for example, a SCSI (Small Computer System Interface) or a Fibre Channel, etc.

The disk drives 5 are devices that may include storage media such as, for example, a hard disk drive or non-volatile memory, etc. The disk drives 5 may have a RAID (Redundant Arrays of Independent Disks) configuration. Several disk drives 5 may be seen as a single virtual device (VDEV: Virtual Device) under RAID control. A logical device (LDEV: Logical Device) is allocated to the virtual device VDEV, and logical units (LU: Logical Unit) that are logical volumes for access by the host computer 3 are defined. Logical Unit Numbers (LUN) are assigned to each logical unit LU. Further, logical units LU are divided into logical blocks that are a minimum value for I/O access, with logical block addresses (LBA: Logical Block Address) being allocated to each logical block. By way of this, the host computer 3 carries out accesses with respect to data stored in a certain storage regions or extents on specific logical units LU by providing logical addresses comprised of logical unit number LUN and logical block addresses LBA to the disk controller 6 of the storage apparatus 4.

Power supplies 51 are then provided at each disk drive 5. Power supplies 51 are operatively connected to a power supply controller 65 described later via power cables 52, and supply power to the disk drives 5 under the control of the power supply controller 65. The power cables 52 may be constructed from, for example, power supply lines and control lines.

The disk controller 6 comprises a channel adapter (CHA) 61, cache memory (CM) 62, disk adapter (DKA) 63, shared memory (SM) 64, power supply controller 65, and service processor (SVP) 66, with these modules or components being connected to each other using a connection unit 67. In FIG. 1, just one of each of these modules is shown but configurations with multiples of these modules are possible to give redundancy.

The channel adapter 61 may be a module or system circuit functioning as a communication interface for communicating with host computers 3 connected via the network 2 based on I/O access requests.

The cache memory 62 temporarily stores data exchanged between the host computers 3 and the disk drives 5 in order to provide high system performance with respect to the host computers 3. The cache memory 62 is utilized in the exchange of data between the channel adapter 61 and the disk adapter 63.

The disk adapter 63 may be a module or system circuit functioning as an interface for controlling I/O access for the disk drive 5. Namely, the disk adapter 63 fetches data from the cache memory 62, stores the data in the disk drive 5, reads data from the disk drive 5, and writes data to the cache memory 62. The disk adapter 63 also carries out RAID control on the disk drive 5.

The shared memory 64 stores system configuration information relating to the storage system 4 and directory information for cache operations, together with various tables such as LDEV-VDEV allocation tables, LDEV management tables, and tables for VDEV use, etc.

The power supply controller 65 controls the power supplies 51 operatively connected via the power cables 52. More specifically, when the power supply of a specific disk drive 5 is turned off, the power supply controller 65 instructs the corresponding power supply 51 to stop the supply of power. In response to this instruction, the power supply 51 stops the supply of power to the disk drive 5. Further, in the event that the power supply of a specific disk drive 5 goes on, the power supply controller 65 instructs the corresponding power supply 51 to start supplying power. In response to this instruction, the power supply 51 starts to supply power to the disk drive 5. If a RAID group is configured from a plurality of disk drives 5, the power supply controller 65 may control the power supplies 51 in RAID group units. Further, the power supply controller 65 prevents data on the disk drive 5 from being erased or damaged by delaying instructions by a fixed time while the power supply of the disk drive 5 is going off. In this embodiment, the power supply controller 65 is configured as an independent module, but a configuration where this function is incorporated at the disk adapter 63 is also possible.

A service processor 66 is a service processor (SVP) for managing the whole of the storage system 4. The service processor 66 is operatively connected to the management terminal 8 via a LAN constituted by the use of an Ethernet (registered trademark) etc. The service processor 66 provides a system administrator with various information relating to the storage system 4 via the management terminal 8, and reflects instructions provided by the system administrator at the storage system 4. Specifically, the service processor 66 receives instructions from the management terminal 8, refers to and changes the content of the shared memory 64, and gives instructions to processors provided at the channel adapter 61 and the disk adapter 63. Further, the service processor 66 instructs the power supply controller 65.

A connection unit 67 is configured as described above from crossbar switches, etc. The connection unit 67 mediates arbitration for inputted data signals, switches paths for data signals, and constructs paths for transmission source modules and transmission destination modules. The connection unit 67 may also be switching elements in a packet switching method.

Figure 2:
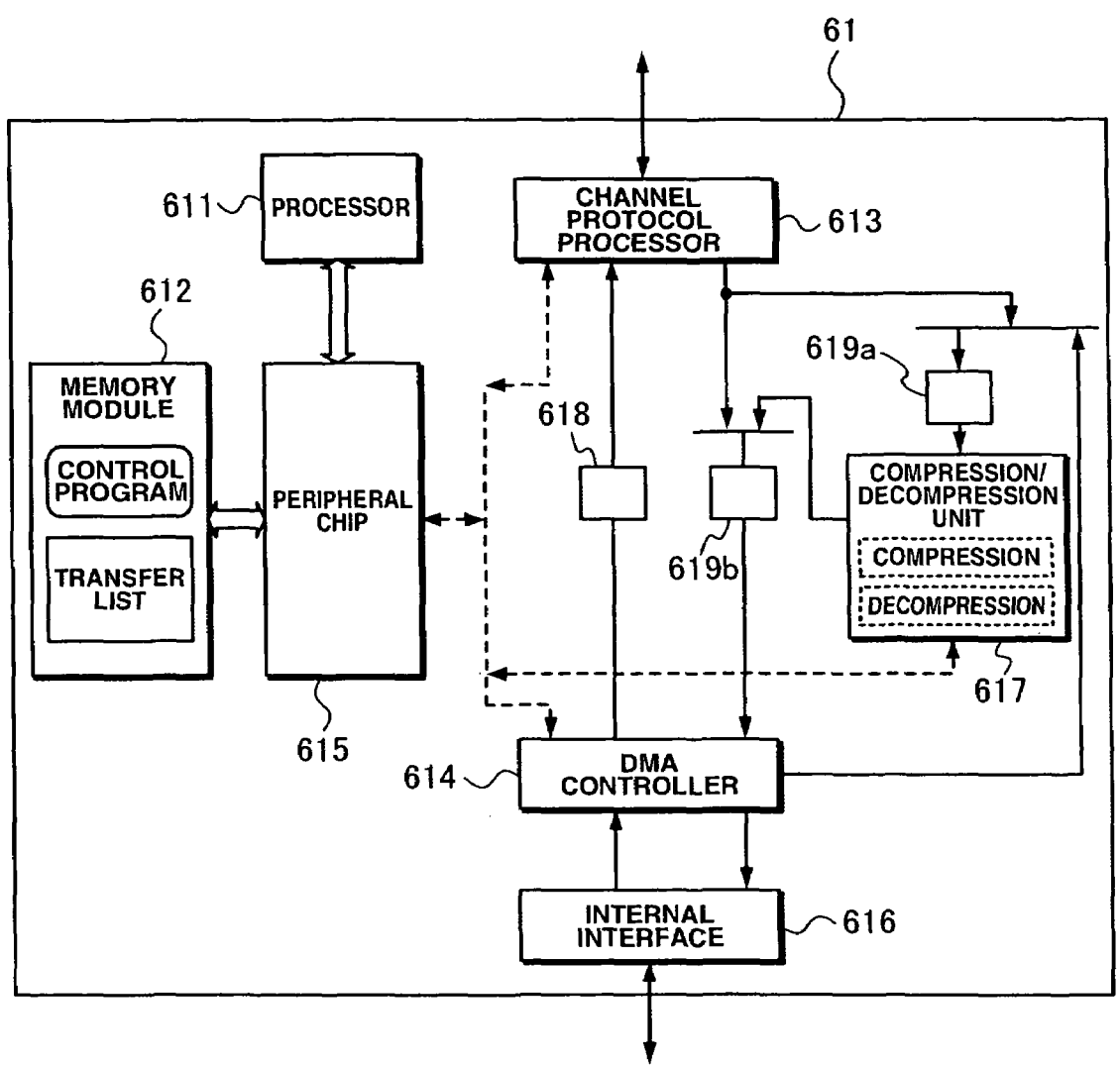
FIG. 2 is a block diagram showing a configuration for a channel adapter of an embodiment of the present invention.

FIG. 2 is a block diagram showing a configuration for the channel adapter 61 of an embodiment of the present invention. Referring to FIG. 2, the channel adapter 61 includes a processor 611, memory module 612, channel protocol processor 613, and DMA controller 614, with these modules or components being connected to a peripheral chip 615 via an internal bus. The channel adapter 61 also includes an internal interface 616, compression/decompression unit 617, and buffers 618 and 619.

The processor 611 accesses the memory module 612 via the peripheral chip 615, executes a control program 6121 stored in the memory module 612, and performs overall control of the channel adapter 61. The memory module 612 stores the various control programs and transfer lists, which are provided for utilization at the processor 611, channel protocol controller 613, and DMA controller 614. The transfer list is a list containing addresses on the cache memory 64, and refers to data transfer processing by the DMA controller 119.

The channel protocol processor 613 carries out protocol control for the network 2, receives data from the host computer 3, and converts this data to data for within the storage system 4. Further, the channel protocol processor 613 performs protocol control on internal data, performs protocol control on data to be sent to the host computer, and converts this data to communication data. Upon receiving an I/O access request from the host computer 3, the channel protocol processor 613 interprets this request, extracts host computer identification information and a logical block address LBA, and gives notification of this to the processor 611 via the peripheral chip 615. The processor 611, in response to this, creates a transfer list based on directory information stored in the shared memory 64, and thereafter stores the transfer list in the memory module 612. The processor 611 then controls operation of the DMA controller 614 to transfer data in accordance with the I/O access request based on the created transfer list.

The internal interface 616 functions as an interface across within the channel adapter 61 and other modules within the storage system 4. The internal interface 616, for example, converts data between being logical and physical data.

The compression/decompression unit 617 carries out compression or decompression of data stored in a front stage buffer 619*a*. As described later, in trial compression mode, the compression/decompression unit 617 does not send compressed data to a rear stage buffer 619*b*, whereas, in main compression mode, the compression/decompression unit 617 sends compressed data to the rear stage buffer 619*b*. In the case of carrying out compression processing on the data, the compression/decompression unit 617 notifies the processor 611 of the compression rate of this data via the control system bus.

The DMA controller 614 writes data stored in the rear stage buffer 619*b* in the cache memory 62 or reads data from the cache memory 62, and writes this to the buffer 618. Specifically, in the event that an access request received from the host computer 3 is a write request, data received from the host computer 3 via the internal interface 616 is written to a region of cache memory 62 indicated by an address described in the transfer list. Further, in the event that the access request received from the host computer 3 is a read request, data is read out from a region of the cache memory 62 indicated by an address described in the transfer list, and is sent to the channel protocol controller 613 via the buffer 618. The channel protocol controller 613 receives this data and then sends the data to the host computer 3 in accordance with predetermined protocol control.

In the event that the read-requested data is not in the cache memory 62, but is stored in a disk drive 5, the DMA controller 614, in advance processing to read from the cache memory 62, provides an instruction to the disk adapter 63 to store data stored in the disk drive 5 in the cache memory 62. The DMA controller then reads out data in accordance with the transfer list at the stage where data is written in to the cache memory 62, and sends this data to the channel protocol controller 613. In general, a series of processes for relocating data stored in the disk drive to cache memory is referred to as 'staging,' and a series of processing for storing data located in cache memory on a disk drive is referred to as 'destaging.'

Further, the DMA controller 614 receives a request for the processor 611 to access the shared memory 64 via the control system bus. Upon receiving this access request, the DMA controller 119 accesses the shared memory 64 via the internal interface 616, and sends the result to the processor 611 via the control system.

As shown in the following, data outputted from the channel protocol controller 114 is stored in the front stage buffer 619a and the rear stage buffer 619b in order to calculate compression rate.

Further, data inputted from the internal interface 616 and outputted from DMA controller 614 is stored in buffer 618 when compression or decompression processing is not carried out. Further, when compression or decompression processing is carried out, data outputted from the DMA controller 614 is stored in the front stage buffer 619a.

A description is now given of compression processing by the channel adapter 61. Compression processing by the channel adapter 61 of this embodiment includes this compression processing for carrying out compression processing to output compressed data and trial compression processing taking place prior to main compression processing for calculating the compression rate in the case of compressing data. In addition to compressing received data in accordance with predetermined conditions every write request from the host computer 3, the channel adapter 61 reads out data stored in the disk drive 5 in accordance with instructions of the system administrator operating the management terminal 8 and compresses the read-out data.

When the channel protocol processor 613 receives a write request, the processor 611 accesses the shared memory 64, and checks whether or not a compression mode for the logical device that is the storage destination of the data is set to a compression attribute in accordance with this write request. When it is determined that the write request is for a logical device LDEV set at the compression attribute, the processor 611 outputs an instruction to carry out trial compression processing to the compression/decompression unit 617 via the control bus.

With the trial compression processing, the compression/decompression unit 617 discards the data without outputting compressed data obtained by compressing the data to the rear stage buffer 619b. The compression/decompression unit 617 calculates the compression rate from the size of the compressed data with respect to the size of the original data and notifies the processor 611 of the calculated compression rate. Further, with trial compression processing at the time of receiving data, the channel protocol processor 613 stores data received from the host computer 3 in both the front stage buffer 619a and the rear stage buffer 619b. Thus, even if the compression/decompression unit 617 discards the compressed data, the received data is written to the cache memory 62 as a result of the DMA controller 614 reading data stored in the rear stage buffer 619b.

The processor 611 compares the compressed rate received from the compression/decompression unit 614 and a predetermined reference value (for example, 50%), and determines whether or not this compression rate is below the predetermined reference value. The compression rate being lower than the predetermined reference value means that efficiency is better for when there is data compression rather than not having data compression from the point of view of the quantity of data. When the compression rate is lower than a predetermined value, the processor 611 produces a transfer list, and outputs an instruction to the DMO controller 614 so that the received data written to the cache memory 62 is read out. In response to this, the DMA controller 614 reads out the received data from the cache memory 62 in accordance with the transfer list, and writes this to the front stage buffer 619a. The compression/decompression unit 617 reads out data stored in the front stage buffer 619a, compresses the read out data based on a predetermined compression algorithm, and writes the compressed data to a rear stage buffer 619b. The DMA controller 617 then reads out compressed data from the rear stage buffer 619b in accordance with a new transfer list, and writes the compressed data to a further region of the cache memory 62.

Figure 3:
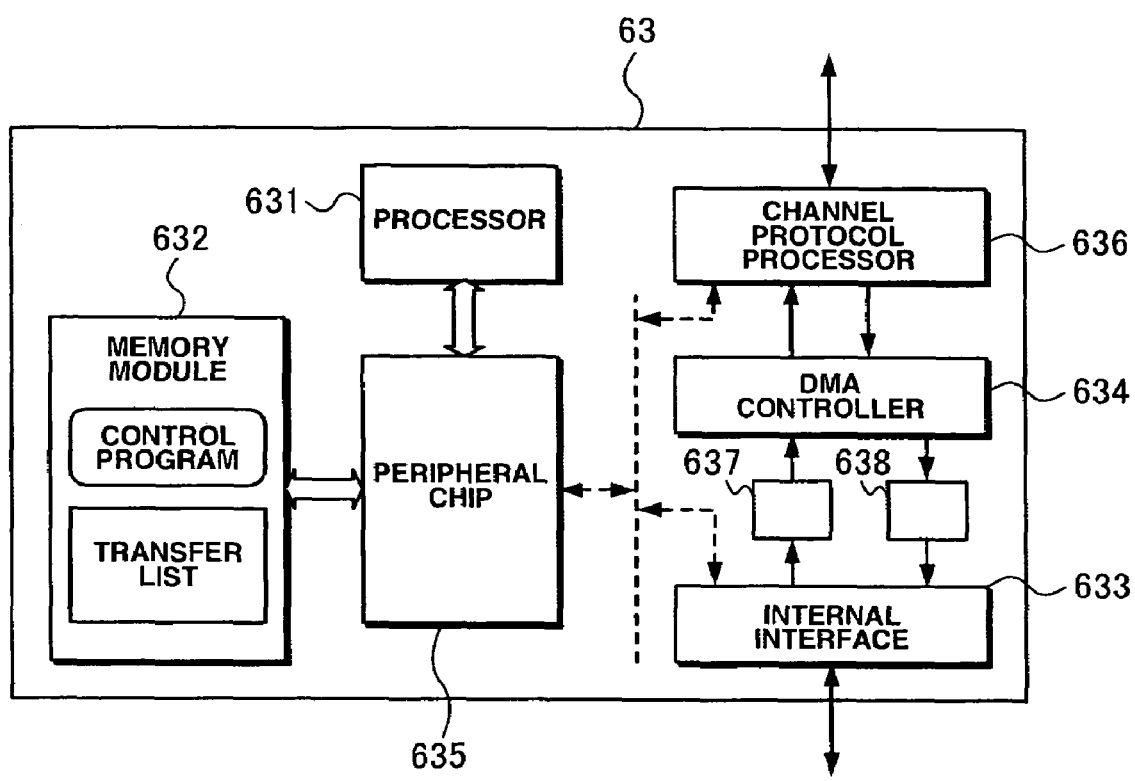
FIG. 3 is a block diagram showing a configuration for a disk adapter of an embodiment of the present invention.

FIG. 3 is a view showing a configuration for the disk adapter 63 of an embodiment of the present invention. As shown in FIG. 3, the disk adapter 63 comprises a processor 631, memory module 632, and channel protocol processor 633 and DMA controller 634 connected via buffer 637 and 638, which are correspond to buffer 618 and 619b. These modules or components are then connected to a peripheral chip 635 via the internal bus. The channel adapter 61 is provided with the internal interface 616. The disk adapter 63 functions as an interface with the external apparatus, and has the same structure as the channel adapter 61. Further, the same configuration as for the channel adapter 61 described above is adopted, with the exception that the installed control program is different. Namely, the disk adapter 61 is configured to include a compressor/decompressor, and compression processing is carried out in place of the channel adapter 61.

The processor 631 accesses the memory module 632 via the peripheral chip 635, executes a control program 6321 stored in the memory module 632, and performs overall control of the channel adapter 61.

Specifically, the processor 631 refers to the directory information stored in the shared memory 64, acquires the address of a region of the cache memory 62 storing data requested for writing by the host computer 3, or acquires an address of a region of the cache memory 62 where data requested for reading by the computer 3 is stored. The processor 631 then accesses the cache memory 62 in accordance with requests from the channel adapter 61 or at predetermined time intervals, and performs control in such a manner as to store data written to the cache memory 62 in the disk drive 5. Further, if data requested to be read out by the host computer 3 does not exist in the cache memory 62, the processor 631 carries out control in such a manner that data is read from the disk drive 5 based on an instruction from the channel adapter 61 and this data is written to the cache memory 62. Moreover, if a free region for writing the data requested to be written does not exist in the cache memory, the processor 631 carries out control in such a manner that data that is already written to the cache memory 62 is stored in the disk drive 5.

With the storage system 4 of this embodiment, the plurality of disk drives 5 are regarded as one or a plurality of virtual devices VDEV under RAID control by the disk controller 6. It is then possible for one virtual device VDEV to be one RAID group. FIG. 4 illustrates a virtual device VDEV of the storage system 4 of an embodiment of the present invention.

Figure 4A:
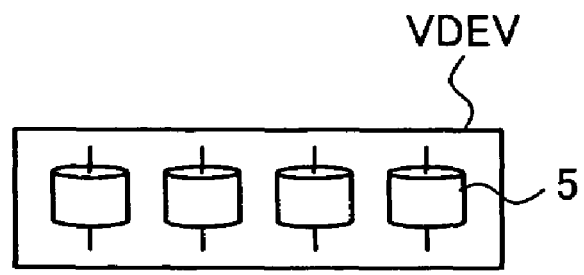
FIGS. 4A-4D illustrates a virtual device of a storage system of an embodiment of the present invention.

Referring to FIG. 4A, one virtual device VDEV is configured using four disk drives 5. In this case, various RAID modes (e.g., RAID1, 4, 5, 6) may be adopted for the virtual device VDEV. The disk controller 6 preferably carries out power supply control every one virtual device (i.e. RAID group). For example, in the case that RAID5 (3D+1P) is adopted, when the supply of power to two disk drives 5 of these disk drives is stopped, this no longer functions as virtual device VDEV.

Figure 4B:
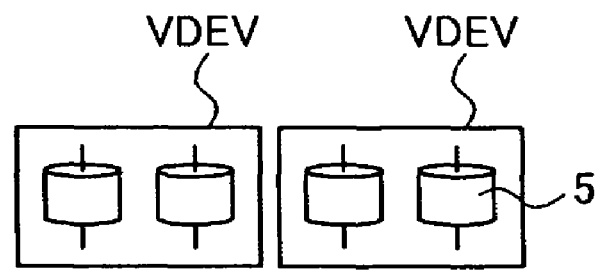
Figure 4C:
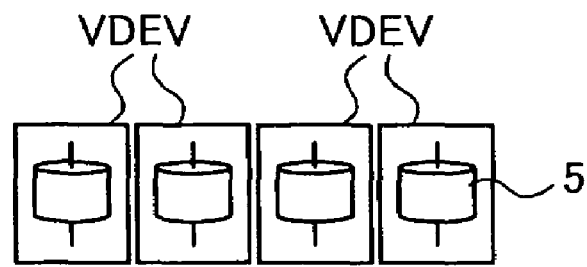
Figure 4D:
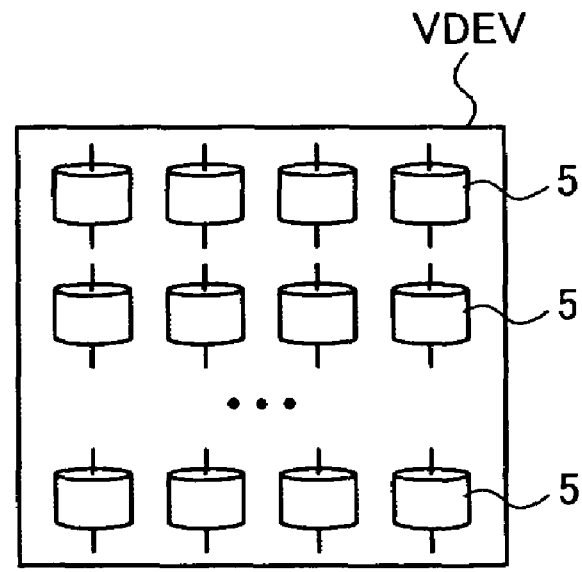

Further, with a predetermined number of disk drives 5, in the case of managing using smaller units, for example, as shown in FIG. 4B, a single virtual device VDEV may be configured using two disk drives 5. Alternatively, as shown in FIG. 4C, a single virtual device VDEV may be configured using one disk drive 5. The selection of the kind of configuration for the virtual device preferably takes into consideration balancing of reliability, availability, accessibility, and the results of decrease in power consumption.

In addition, as shown in 4D, it is possible to connect a plurality of RAID groups to give a single virtual device DEV.

Further, in the event of allocation of a plurality of VDEV's to one logical device LDEV, an extremely large logical device LDEV can be supplied to the host computer 3.

In this embodiment, the relationship between the logical device LDEV and the virtual device VDEV is defined in the LDEV-VDEV allocation table stored in the shared memory 64.

FIG. 5 shows an example of an LDEV-VDEV allocation table 500 of a storage system 4 of a first embodiment of the present invention.

Referring to FIG. 5, the LDEV-VDEV allocation table 500 includes an LDEV column 501, LBA column 502, compression state column 503, VDEV column 504, data length column 505, and data length column 506 for after compression. LDEV column 501 indicates the identification number of the logical device. LBA column 502 indicates the leading address and end address of the logical block. Compression state column 503 indicates whether or not compression has been carried out for a region indicated in the LBA column 502 of this logical device LDEV. A value of "0" for the compression state column 503 indicates that compression has not been carried out on this region, whereas "1" indicates that compression has been carried out. The VDEV column 504 indicates the identification number of the virtual device and the beginning address of the logical block. Data length column 504 indicates the length of data stored in a region starting from the lead logical address LBA of this virtual device VDEV. Data length after compression indicates the estimated length of data after compression of the data. Typically, the data length after compression depends on the content of the data etc., but as this cannot be determined, two types of values of data length (for before compression) and data length after compression are managed.

FIG. 6 shows an example of an LDEV management table 600 of the storage system 4 of the first embodiment of the present invention. The LDEV management table 600 is a table indicating properties of the logical device LDEV. The LDEV management table 600 is also held in the shared memory 64.

As shown FIG. 6, the LDEV management table 600 includes an LDEV column 601, compression mode column 602, access frequency column 603, logical capacity column 604, and estimated capacity after compression column 605. LDEV column 601 is an identification number for a logical device LDEV. Compression mode column 602 shows a compression mode. In this embodiment, "compression (automatic)", "compression (instructed), "none (automatic)", and "none (instructed) exist as attributes for compression mode. As described in the following, the system administrator operating the management terminal 8 is able to select "automatic", "compression", and "none" as the compression mode. When "automatic" is selected, attributes of "compression (automatic) or "none (automatic)" are provided using configuration optimization processing.

The access frequency column 603 indicates the number of accesses per predetermined unit time (e.g., one second, one hour, etc.). For example, when the processor 631 counts the number of accesses from the host computer 3 for a predetermined measured time, the number of accesses per unit time is calculated after this measurement time and is written to the LDEV management table of the shared memory 64. For example, taking the measurement time as ten minutes, and taking that there are 3,000 accesses during this time, this means that there are 50,000 accesses per second. As described in the following, the access frequency value may also be based on a determination of whether or not compression is necessary for a logical device LDEV. Further, the compression rate may be decided based on this access frequency. Namely, the compression rate may be set to be small with respect to logical devices LDEV where the access frequency is high, and as a result, it is possible to keep a fall in system performance accompanying the compression processing to a minimum.

The logical capacity column 1204 indicates the capacity of this logical device LDEV. Namely, the host computer 3 recognizes the capacity value indicated in the logical capacity column 604 as the capacity of this logical device LDEV. The estimated capacity after compression column 605 indicates the capacity of the logical device LDEV after compression. The capacity of the logical device LDEV after compression is obtained by referring to the LDEV-VDEV allocation table 500 described above but the estimated capacity after compression column 605 is provided at the LDEV management table.

Figure 7:
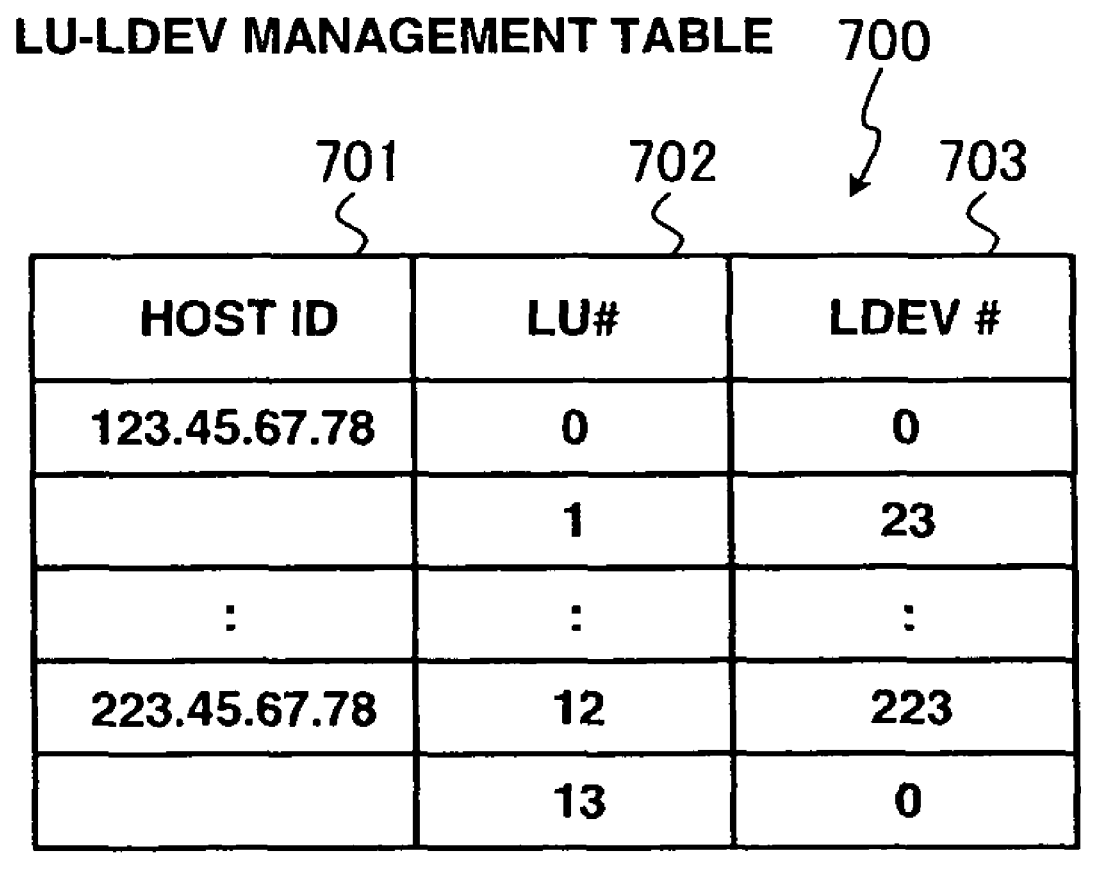

FIG. 7 shows an example of an LU-LDEV management table 700 of a storage system 4 of a first embodiment of the present invention. The LU-LDEV management table 700 is a table indicating the relationship between the logical units LU and the logical devices LDEV. The LU-LDEV management table 700 is also held in the shared memory 64.

Referring to FIG. 7, the LU-LDEV management table 700 includes a host ID column 701, LU column 702, and LDEV column 703. The host ID column 701 indicates the ID of the host computer 3. The ID is, for example, with the Fibre Channel protocol, the port ID of the HBA (Host Bus Adapter) mounted on the host computer 3. The LU column 702 indicates the number of the logical unit LU instructed by the host computer 3 during I/O accesses. The LDEV column 703 indicates logical device LDEV numbers correlating the host computer 3 and the logical volumes LU.

One logical device LDEV can be shared or not shared at a plurality of host computers 3 depending on the content of the LU-LDEV management table. In this way, it is possible for the host computer 3 to access the logical devices LDEV by correlating the logical devices LDEV supplied to the host computer 3 and the logical units LU recognized by this host computer 3. Namely, the host computer 3 carries out accessing of the logical device LDEV based on the number of the logical unit LU. Which virtual device VDEV data subject to an access request is stored in is of no concern to the host computer 3. Therefore, as described later, it is not necessary to change the settings of the host computer 3 even if compression processing is carried out on the data on the virtual device VDEV or even if data is transferred between virtual devices VDEV.

Figure 8:
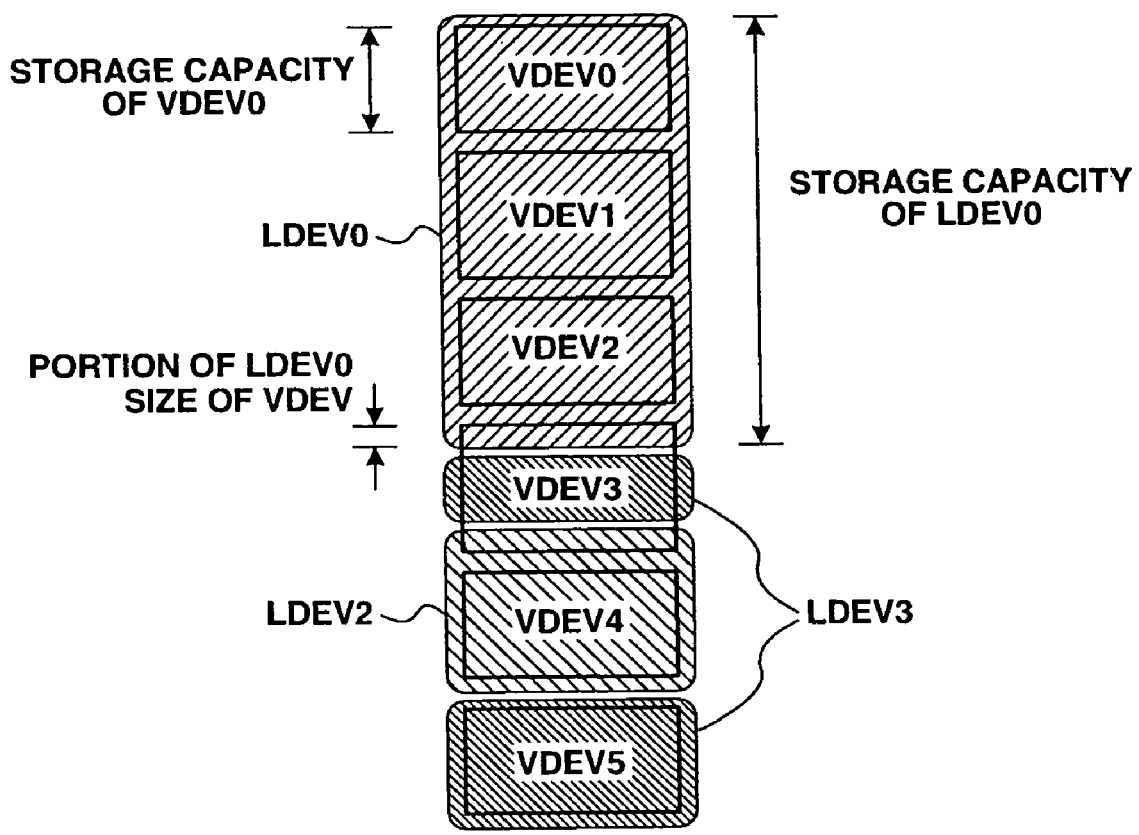
FIG. 8 illustrates a relationship between a logical device LDEV and a virtual device VDEV of the storage system of an embodiment of the present invention.

FIG. 8 illustrates the relationship between a logical device LDEV and a virtual device VDEV of the storage system 4 of an embodiment of the present invention.

Referring to FIG. 8, the logical device LDEV0 is allocated in a lateral manner on a plurality of virtual devices VDEV0 to 3. At this time, the virtual devices VDEV0 to VDEV3 are divided into virtual device VDEV0 to VDEV2 (taken to be referred to as "overall virtual device") that are all allocated to the logical device LDEV0, and virtual device VDEV3 (taken to be referred to as "partial virtual device"), only part of which is allocated to logical device LDEV0. The partial virtual device is shared at a plurality of logical devices LDEV. In this example, logical devices LDEV1 and LDEV2 are further allocated to the virtual device VDEV3, and storage regions are provided to logical devices LDEV0 to LDEV2.

Further, although not shown in the drawings, if the storage capacity of the logical device LDE is smaller than the storage capacity of the virtual device VDEV, just part of the virtual device VDEV is allocated to the logical device LDEV.

Figure 9:
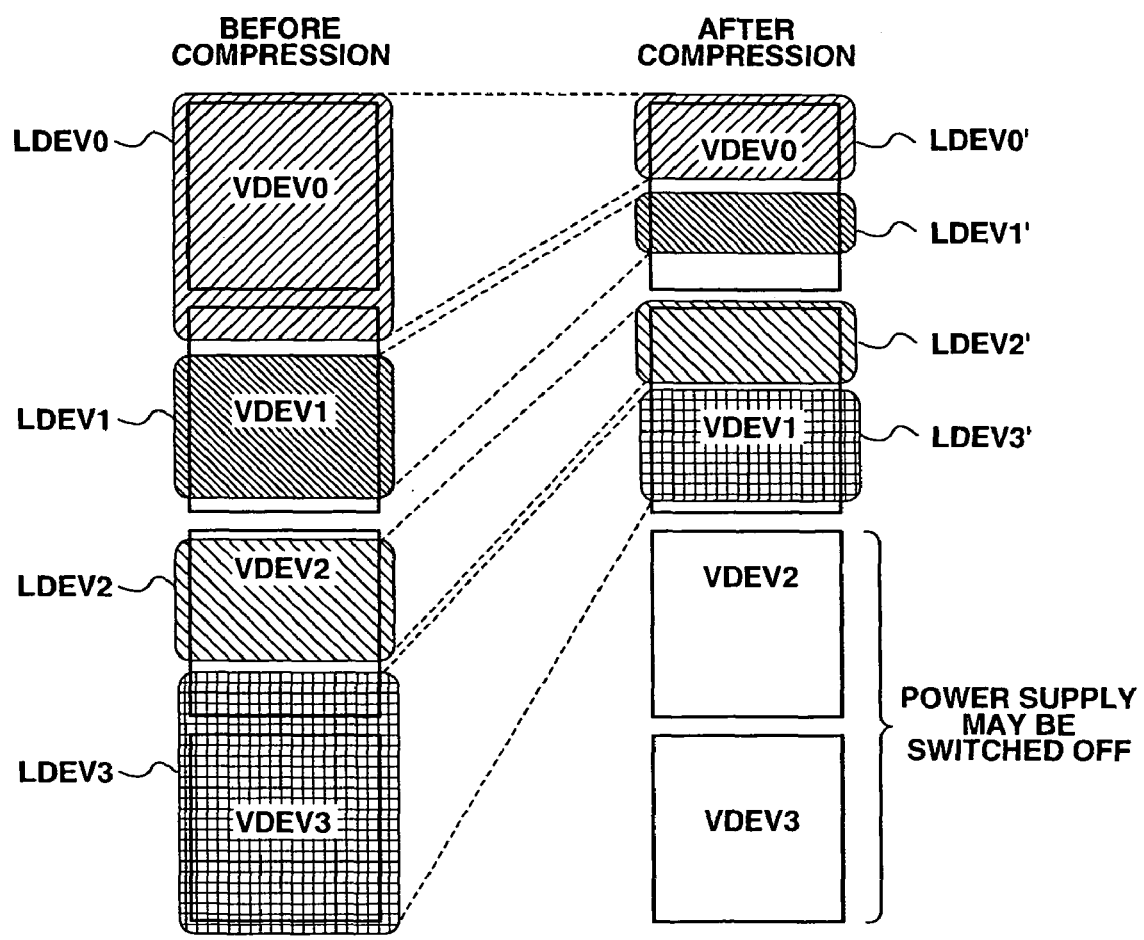
FIG. 9 illustrates low power consumption control of the storage system of an embodiment of the present invention.

FIG. 9 is an outline view illustrating low power consumption control of the storage system 4 of an embodiment of the present invention.

As shown in FIG. 9, four virtual devices VDEV0 to VDEV3 are defined at the storage system 4, and four logical devices LDEV0 to LDEV3 are defined on the virtual devices VDEV0 to VDEV3. Compression is then carried out for these logical devices LDEV0 to LDEV3, and it is take that logical devices LDEV0' to LDEV3' are obtained where this size is small. In this case, if the logical devices LDEV0' to LDEV3' are allocated only to logical device VDEV0 and VDEV1, a storage service, i.e. the supply of access to the logical devices LDEV0 to 3 to the host computer 3 can be continued even if the supply of power to the disk drives 5 constituting the remaining virtual devices VDEV2 and VDEV3 is stopped.

Typically, the time required for compression/decompression processing is much shorter than for the stage of the time required in spin up processing of the disk drive 5 and it is therefore possible to reduce power consumption by spinning off the disk drives 5 while continuing the supply of storage services to the host computer 3.

In this embodiment, for simplicity of description, logical devices LDEV are taken to be allocated to a continuous region on the virtual device VDEV. Further, one logical device LDEV is taken to contain just one partial virtual device. If the partial virtual device contained in one logical device LDEV is made as small as permissible, it is possible to stop the supply of electrical power and contribute to the reduction of power consumption without considering the usage conditions of other logical devices LDEV. However, it is also possible to carry out processing for respective partial virtual devices while making configuration optimization plans as described in the following even in cases where one logical device LDEV contains a plurality of partial virtual devices.

FIG. 10 shows an example of a table 1000 for usage of VDEV of a storage system 4 of an embodiment according to the present invention. The table 1000 for usage of VDEV is also held in the shared memory 64.

When data stored in the disk drive 5 is compressed, it is not known what size region is required because the size of the compressed data cannot be determined. Because of this, the storage system 4 of this embodiment carries out trial compression processing on this data, and when the compression rate falls below a predetermined reference value, compression is carried out on the data. At this time, the size of the data stored before compression is different to the size of the compressed data. Thus, a new storage region is required in a case when a storage region in which the original data was stored becomes free or when a storage region storing already compressed data is newly overwritten.

The storage system 4 then manages the free storage region using a table for usage of VDEV while estimating the size of the data to be written in future. Specifically, the table 1000 for usage of VDEV includes a bitmap region 1001 and a number of free segments column 1002. The bitmap region 1001 indicates whether or not each virtual device VDEV is in use each segment that is a management unit of the storage region. The number of free segment columns indicates the number of segments for a free state occurring at this virtual device VDEV. If all of the segments occurring at a certain virtual device VDEV are in a free state, the supply of power to this virtual device VDEV is stopped.

Figure 11:
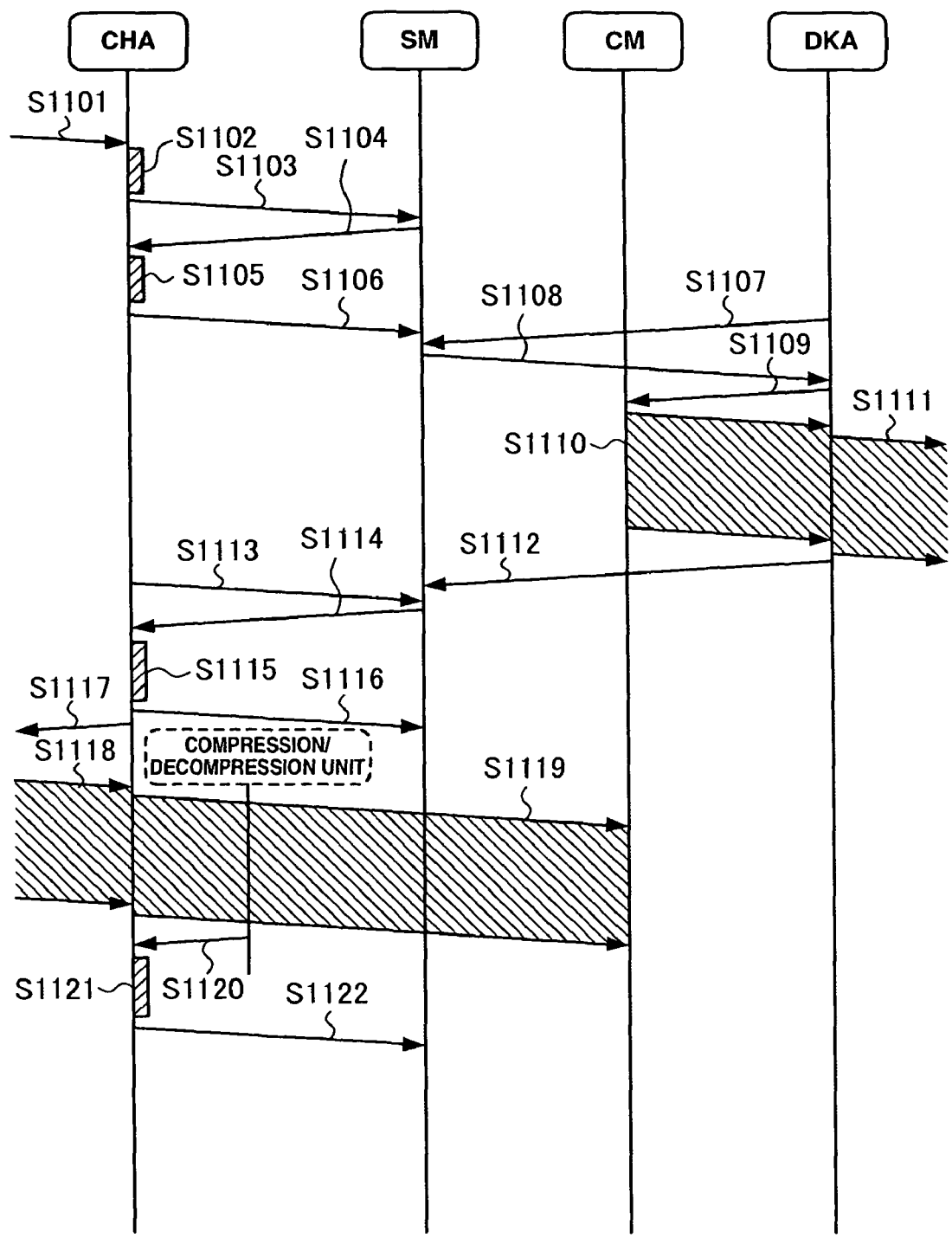
FIG. 11 illustrates a sequence diagram illustrating processing at the time of a write request at the storage system of an embodiment of the present invention.

FIG. 11 is a sequence diagram illustrating processing at the time of a write request at the storage system 4 of an embodiment of the present invention. In this example, an access request from the host computer 3 is a request to write data to a logical device LDEV for which an uncompressed attribute is supplied and shows processing in the case where this data does not exist on the cache memory 62 and where a sufficient free region cannot be ensured on the cache memory 62.

Specifically, as shown in FIG. 11, when the channel adapter 61 receives an access request from the host computer 3 via the network 2 (S1101), the received access request is decoded, and the requested operation (i.e. write operation) and logical address (logical unit number LUN and logical block address LBA) are acquired (S1102).

The channel adapter 61 then refers to directory information stored in the shared memory 64 (S1103), and checks whether or not data is stored in the cache memory 62 in accordance with the write request (S1104). In this diagram, the channel adapter 61 refers only one time to the shared memory 64, but in reality, the shared memory 64 is referred to a number of times. In this example, as a result of this, the channel adapter 61 recognizes that this data is not stored in the cache memory 62, and recognizes that there is no free region. The channel adapter 61 therefore exerts control in such a manner that other data already existing in the cache memory 62 is destaged, and ensures a region for storing data in the cache memory 62 in accordance with the current write request.

More specifically, the channel adapter 61 specifies data to be destaged in accordance with, for example, an LRU (Least Recently Used) algorithm (S1105), and gives notification of a destage request to the disk adapter 63 via the shared memory 62 (S1106). In the meantime, the disk adapter 63 periodically monitors the shared memory 64 (S1107), and when a destage request written to the shared memory 64 is acquired (S1108), a transfer list is created, the data is read out from the cache memory 62, and data is stored in a predetermined region on the disk drive 5 while exerting RAID control (S1109 to S1111).

When a series of destaging processes are complete, the disk adapter 63 notifies the channel adapter 61 of the effect that the destaging is complete via the shared memory 64 (S1112 to S1114). After updating the directory information of the shared memory 64 (S1115, S1116), the channel adapter 61 sends a request to transmit data to the host computer 3 in accordance with the write request (S1117). The channel adapter 61 then receives data sent from the host computer 3 in response to this transmission request (S1118), and stores this data in a region of the cache memory 62 where the destaged data was stored based on the newly produced transfer list (S1119).

At this time, the compression/decompression unit 617 of the channel adapter 61 carries out trial compression processing on the received data, and notifies the processor 611 of the obtained compression rate (S1120). The channel adapter 61 then calculates the data size after compression and the estimated capacity after compression (S1121), and updates the LDEV-VDEV management table and LDEV management table of the shared memory 64 (S1122).

Figure 12:
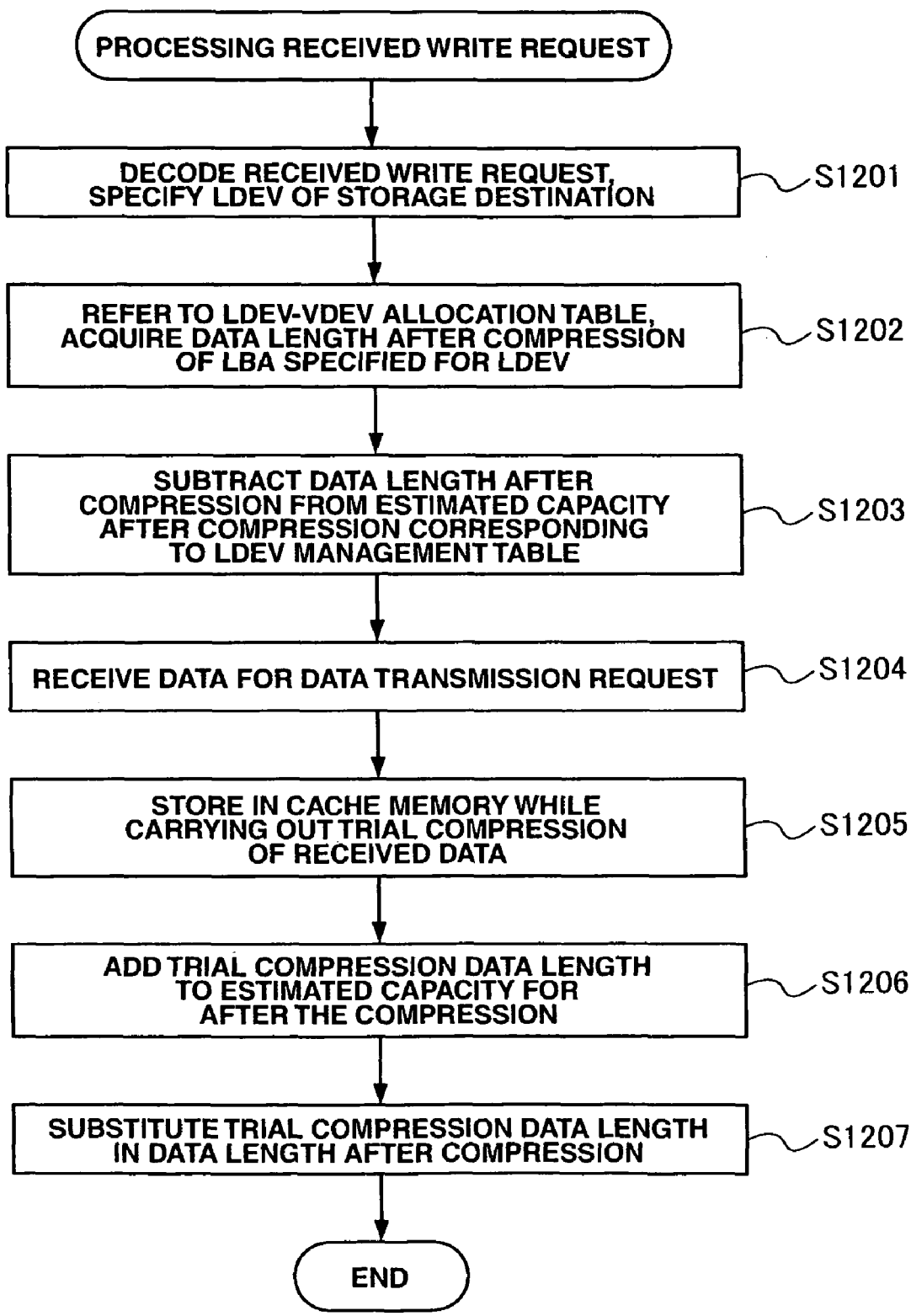
FIG. 12 is a flowchart illustrating processing for updating the LDEV-VDEV management table and the LDEV management table at the time of a write request at the storage system of an embodiment of the present invention.

FIG. 12 is a flowchart illustrating processing for updating the LDEV-VDEV management table and LDEV management table at the time of a write request at the storage system 4 of an embodiment of the present invention. The channel adapter 61 implements processing for this updating by executing a control program under the control of the processor 611.

Referring to FIG. 12, the channel adapter 61 decodes the received write request, and specifies the logical device LDEV for the destination for storing the data in accordance with the write request (S1201). The logical device LDEV of the storage destination can then be specified by referring to the LU-LDEV management table based on a logical address specified by the write request. In this example, the logical device LDEV of the storage destination is taken to be an uncompressed state.

The channel adapter 61 then refers to the LDEV-VDEV allocation table 500 stored in the shared memory 64, and acquires the data length for after compression of data currently stored as indicated in the data length column 506 for after compression specified by the logical block address LBA designated at the logical device LDEV (S1202). Next, the channel adapter 61 refers to the LDEV management table 600 and subtracts the corresponding data length for after compression acquired from the estimated capacity for after compression indicated in the estimated capacity after compression column 605 (S1203).

Subsequently, the channel adapter 61 sends a data transmission request to the host computer 3 that sent the write request, and receives data sent in response to this (S1204). The channel adapter then stores the received data in the cache memory 62 while carrying out trial compression on the received data (S1205). As described above, when no a sufficient free region for storing the data in the cache memory 62 exists, destage processing is carried out prior to the data transmission request.

The channel adapter 61 then adds the compressed data length obtained by the trial compression processing to the estimated capacity for after compression indicated at the estimated capacity for after compression column 605 corresponding to the LDEV management table 600 (S1206), for substitution in the compressed data length indicated at the data length for after compression column 506 (S1207). The channel adapter 61 then updates the LDEV-VDEV allocation table 500 and the LDEV management table 600 based on the newly obtained estimated capacity for after compression and data length for after compression.

As a result, consistency of the data length after compression of the data length after compression column 506 at the LDEV-VDEV allocation table 500 and the estimated capacity for after compression of the estimated capacity for after compression column 605 at the LDEV management table 600 is maintained.

Figure 13:
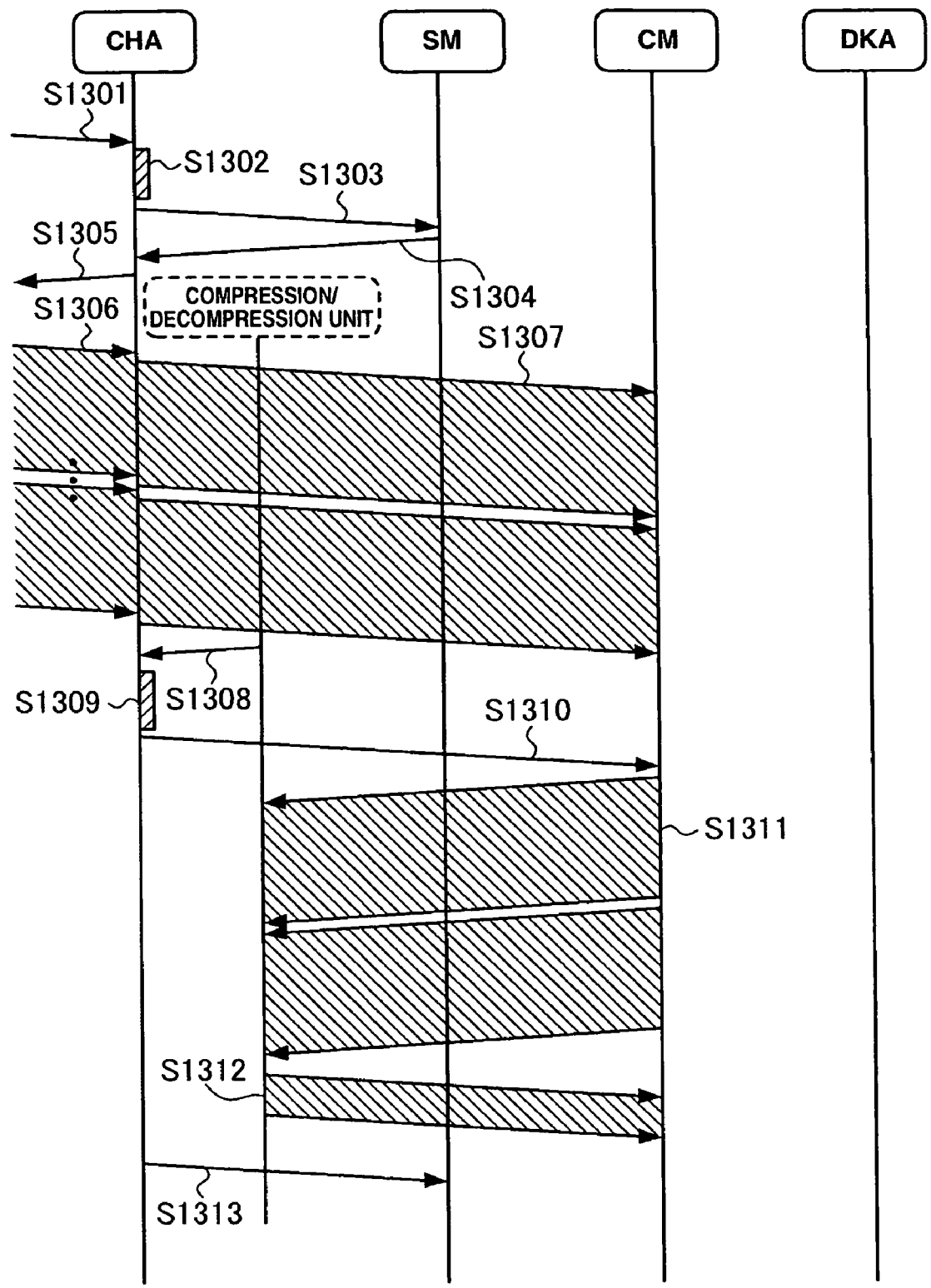
FIG. 13 is a sequence diagram illustrating processing at the time of a write request at the storage system of an embodiment of the present invention.

FIG. 13 is a sequence diagram illustrating processing at the time of a write request at the storage system 4 of an embodiment of the present invention. In this example, an access request from the host computer 3 is a request to write data to a logical device LDEV for which a compression attribute is supplied and shows the flow of processing in the case where this data is not present on the cache memory 62 but a sufficient empty region can be ensured on the cache memory 62.

Specifically, referring to FIG. 13, when the channel adapter 61 receives an access request from the host computer 3 via the network 2 (S1301), the received access request is decoded, and the requested operation (i.e. written operation) and logical address (logical unit number LUN and logical block address LBA) are acquired (S1302).

Then, the channel adapter 61 refers to directory information stored in the shared memory 64 (S1303), and checks whether or not data is stored in the cache memory 62 in accordance with the write request (S1304). In this example, as a result of this, channel adapter 61 recognizes that this data is not stored in the cache memory 62, but recognizes that the free region is sufficient. When the data is not present in the cache memory, the destage processing described above is carried out, and the necessary region is ensured in the cache memory 62. Further, the channel adapter 61 refers to the LU-LDEV management table 700 stored in the shared memory 64, specifies the logical device LDEV corresponding to the logical unit number LUN, refers to the LDEV management table 600, and acquires the attributes of the compression mode of the logical device LDEV. In this example, as a result of this, the channel adapter 61 recognizes that the logical device LDEV is a logical device LDEV with the attribute of the compression mode set to "compression (automatic)".

The channel adapter 61 then sends a data transmission request to the host computer 3 (S1305), and creates a transfer list in such a manner that the transmitted data is stored in a designated region in the cache memory 62. The channel adapter 61 then receives the data from the host computer 3 that received the transmission request (S1306), and stores this data in the cache memory 62 in accordance with the transfer list (S1307). At this time, as described above, the received data is subjected to trial compression by the compression/decompression unit 617 within the channel adapter 61 and the processor 611 is notified of the data length after compression (S1308). At this stage, the compressed data is discarded.

The channel adapter 61 then compares the data length resulting from the trial compression and the original data length, and determines whether or not compression is more effective (S1309). Determination as to whether or not it is more effective to carry out compression may be carried out, for example, based on whether or not the compression rate obtained from the data length for after compression is less than a predetermined value (for example, 50%) with respect to the original data length.

When it is determined that compression is more effective, the channel adapter 61 makes a transfer list, compresses read out data while reading out data stored in the cache memory 62, and writes the compressed data to another region of the cache memory 62 (S1310 to S1312).

The channel adapter 61 then updates the LDEV-VDEV allocation table and the LDEV management table stored in the shared memory 64 in order to maintain consistency (S1313).

The data compressed in the cache memory 62 is then destaged at the disk drive 5 based on another write request of as the result of the passage of a predetermined period of time.

Generally, the efficiency of compression is higher for a larger size of data that is the target of one-time or batch compression processing. It is therefore possible to increase the efficiency of compression by carrying out compression processing to a certain extent on data having a lump size from storing the data in the disk drive 5 rather than upon every write request from the host computer 3. After carrying out batch compression processing, the compression processing described above is carried out every time a write request for this logical device LDEV occurs. In the event that the size of data that is the target of compression processing one time becomes large, it is necessary to provide a region of this size on the cache memory 62 every time a write request thereafter occurs and time is necessary for compression and decompression. Thus, there may be the fear that the performance of the storage system 4 will deteriorate. Further, when the data becomes large to a certain extent, the efficiency of compression becomes saturated. It is therefore preferable to select an appropriate data size to take into consideration these elements.

Figure 14:
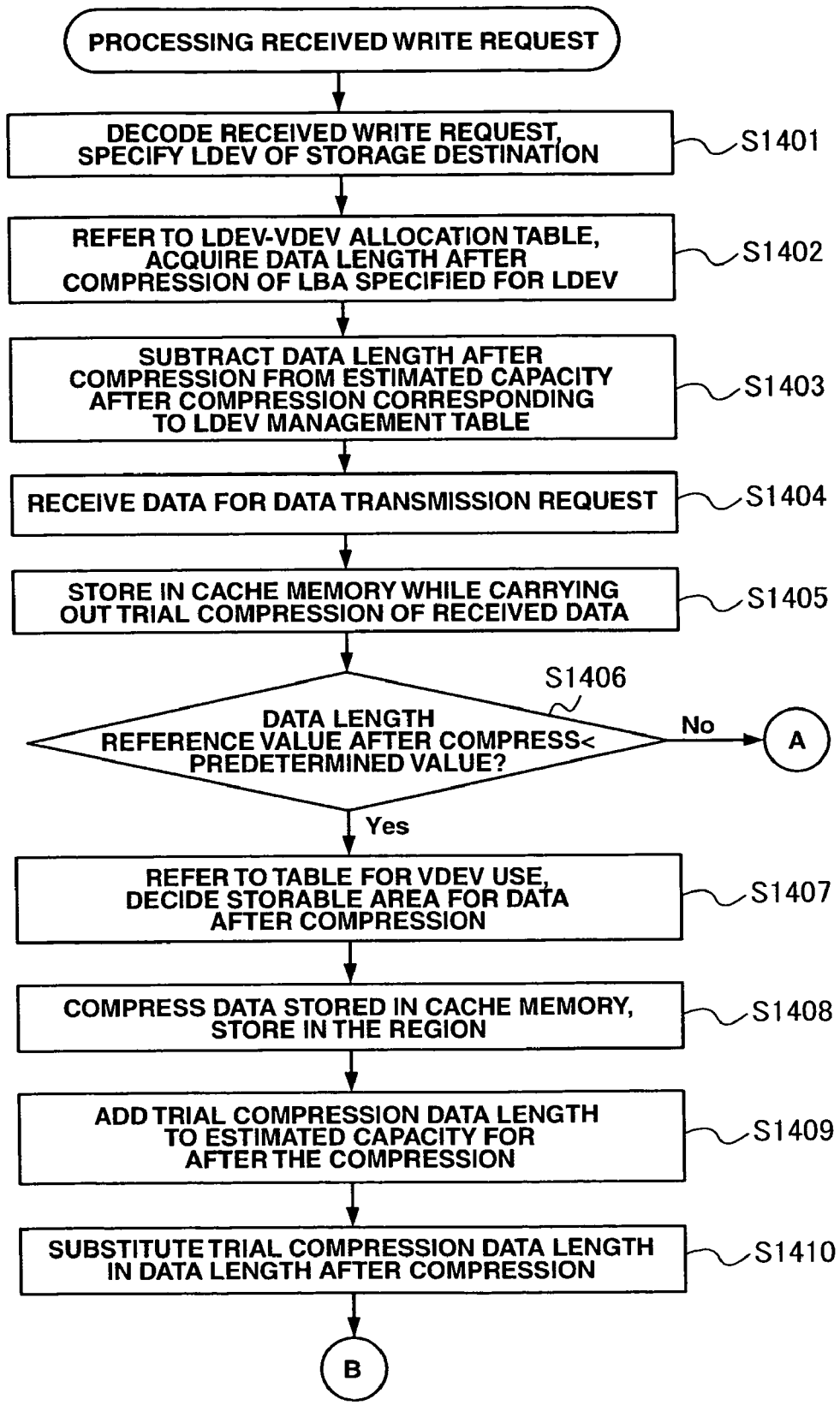
FIG. 14 is a flowchart illustrating processing at the time of batch compression at the storage system of an embodiment of the present invention.
Figure 15:
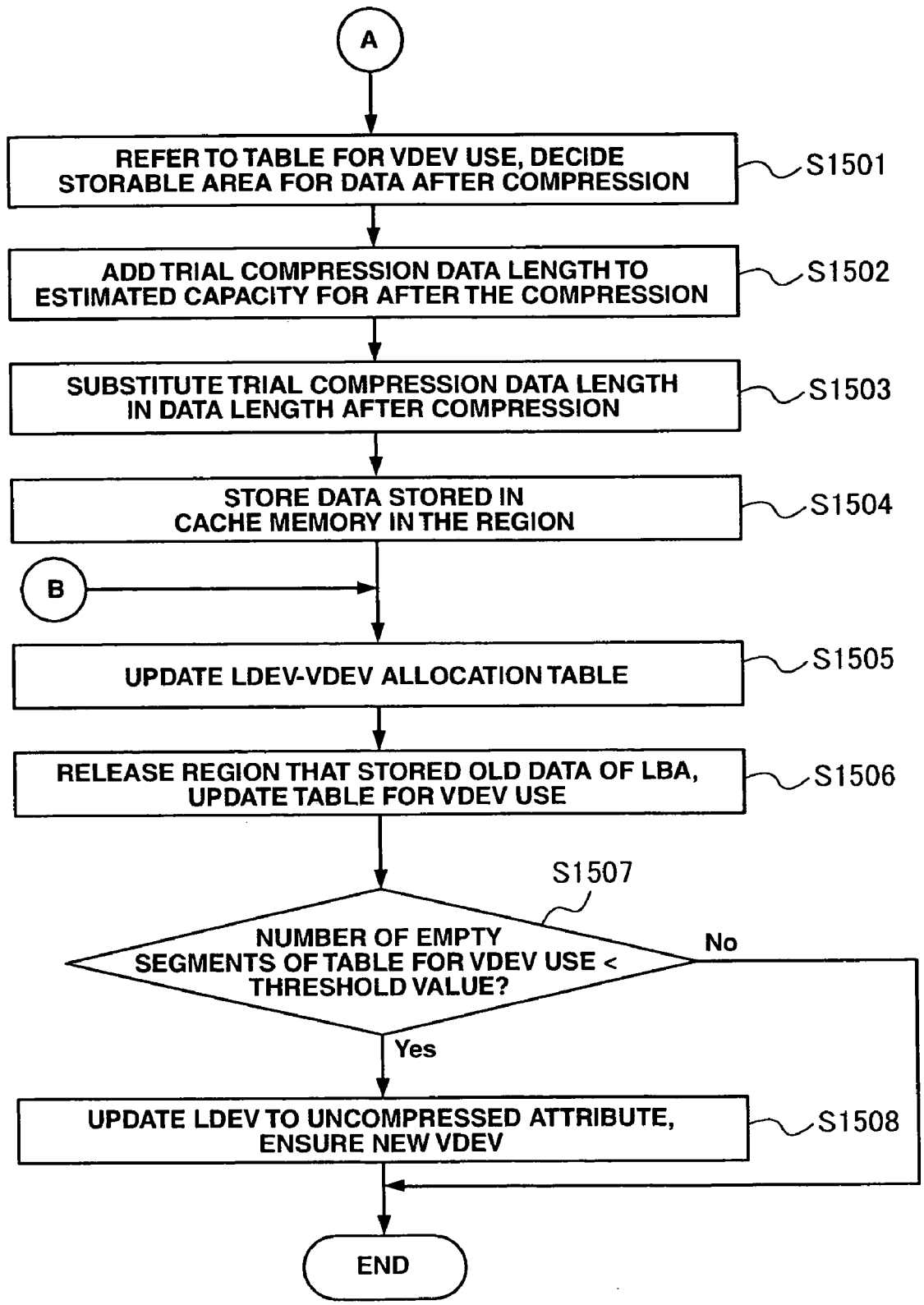
FIG. 15 is a flowchart illustrating processing at the time of batch compression at the storage system of an embodiment of the present invention.

FIG. 14 and FIG. 15 are flowcharts illustrating processing for updating each table at the time of a write request at the storage system 4 of an embodiment of the present invention. The channel adapter 61 implements processing for this updating by executing a control program under the control of the processor 611.

Specifically, referring to FIG. 14, the channel adapter 61 decodes the received write request, and specifies the logical device LDEV for the destination for storing the data in accordance with the write request (S1401). The logical device LDEV of the storage destination can then be specified by referring to the LU-LDEV management table based on a logical address specified by the write request. In this example, it is taken that compression attributes are provided at a target logical device LDEV.

The channel adapter 61 then refers to the LDEV-VDEV allocation table 500 stored in the shared memory 64, and acquires the data length for after compression of data currently stored as indicated in the data length column 506 for after compression specified by the logical block address LBA designated at the logical device LDEV (S1402). Next, the channel adapter 61 refers to the LDEV management table 600 and subtracts the corresponding data length for after compression acquired from the estimated capacity for after compression indicated in the estimated capacity for after compression column 605 (S1403).

The channel adapter 61 sends a data transmission request to the host computer 3 that sent the write request, and receives data sent in response to this (S1404). The channel adapter then stores the received data in the cache memory 62 while carrying out trial compression on the received data (S1405). As described above, in the event that there is not a sufficient region for storing the data in the cache memory 62, destage processing is carried out prior to the data transmission request.

The channel adapter 61 then determines whether or not the compression rate obtained by the trial compression processing falls below the predetermined reference value (S1406). When it is determined that the compression rate obtained as a result of trial compression processing falls below a predetermined value, the channel adapter 61 refers to the table 1000 for usage of VDEV and specifies a storage region of a size capable of storing data after compression of received data (S1407). The channel adapter 61 then reads out and compresses received data stored in the cache memory 62 and writes the data after compression to the cache memory 62. As a result, at a predetermined timing, the disk adapter 63 reads out compressed data from the cache memory 62 for storage in a storage region of a designated logical device LDEV (S1408).

Further, channel adapter 61 then adds the compressed data length obtained by the trial compression processing to the estimated capacity for after compression indicated at the estimated capacity for after compression column 605 corresponding to the LDEV management table 600 (S1409), for substitution in the compressed data length indicated at the data length for after compression column 506 (S1410). The channel adapter 61 then updates the LDEV-VDEV allocation table 500 and the LDEV management table 600 based on the newly obtained estimated capacity for after compression and data length for after compression.

By way of this, consistency of the data length after compression of the data length after compression column 506 at the LDEV-VDEV allocation table 500 and the estimated capacity for after compression of the estimated capacity for after compression column 605 at the LDEV management table 600 is maintained.

In contrast when it is determined that the compression rate obtained from the trial compression processing falls below the predetermined reference value (S1406, "No"), the channel adapter 61 refers to the table 1000 for usage of VDEV and decides upon a storage region capable of storing the received data at a size that is as is (S1501 of FIG. 15).

Further, channel adapter 61 then adds the compressed data length obtained by the trial compression processing to the estimated capacity for after compression indicated at the estimated capacity for after compression column 605 corresponding to the LDEV management table 600 (S1502), for addition to the compressed data length indicated at the data length for after compression column 506 (S1503). The channel adapter 61 then carries out control so that the received data is stored in the specified storage region (S1504). By way of this, at a predetermined timing, the disk adapter 63 reads out received data from the cache memory 62 for storage in the storage region of the logical device LDEV.

When the received data is stored without being compressed, "none" is set in the compression state column 503 for the storage region indicated in the logical block address LBA of the logical device LDEV at the LDEV-VDEV allocation table 500 regardless of the attributes for compression mode of this logical device LDEV. At the time of the read request, the channel adapter 61 determines whether or not decompression processing is required for the read out data by referring to the compression state column 503 of the LDEV-VDEV allocation table 500.

After the processing of S1410 or S1504, the channel adapter 61 updates the LDEV-VDEV allocation table 500 (S1505). Further, the channel adapter 61 updates the table 1000 for VDEV use in such a manner that the storage region indicated by the logical block address LBA of the virtual device VDEV that stored the data previously is shown to be an empty region (S1506).

The channel adapter 61 then refers to the number of free segments column of the table 1000 for usage of VDEV, and checks as to whether or not the ratio of the number of empty segments with respect to the total number of segments has fallen below a predetermined threshold value (for example, 10%) (S1507). When it is determined that the ratio falls below the predetermined threshold value, the channel adapter 61 changes the compression mode of the logical LDEV to uncompressed attribute, allocates a new virtual device VDEV, and starts decompression so that the compressed data is stored in the state of the original data (S1508).

By way of this, when the anticipated compression rate does not become smaller at the time of a write request to a logical device LDEV given compression attributes, the received data is stored without being compressed and the compression attributes of the logical device LDEV are updated.

Figure 16:
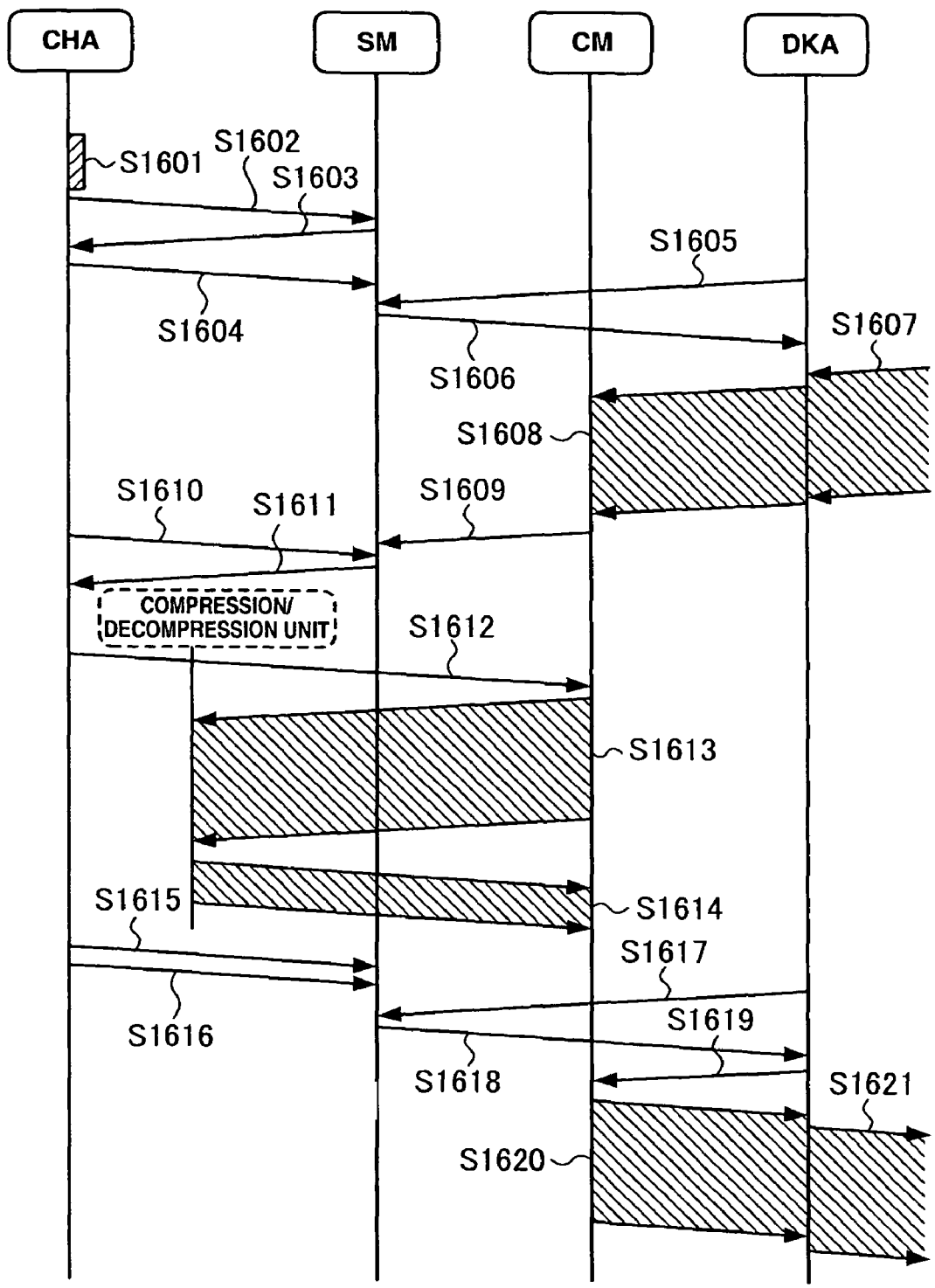
FIG. 16 is a flowchart illustrating processing at the time of batch compression at the storage system of an embodiment of the present invention.

FIG. 16 is a sequence diagram illustrating processing at the time of blanket compression at the storage system 4 of an embodiment of the present invention. This processing is typically carried out when a compression mode attribute of a logical device LDEV is changed from "uncompressed" to "compressed" during operation of the storage system 4.

When the service processor 66 receives a compression command from a system administrator on the management terminal 8, or detects that the estimated capacity for after compression has fallen below a predetermined threshold value, the service processor 66 outputs a compression instruction to the channel adapter 61. In response to this, the channel adapter 61 starts compression of the data on the logical device LDEV (S1601).

The channel adapter 61 then refers to the LDEV-VDEV allocation table 500 and the LDEV management table stored in the shared memory 64 (S1602), and checks for regions of this logical device LDEV that are as-yet uncompressed (S1603). The channel adapter 61 then outputs an instruction to the disk adapter 63 via the shared memory 64 in order to stage as-yet uncompressed data in the cache memory 62 taking units of a predetermined data size (S1604 to S1606).

The disk adapter 63 then reads out data designated for compression from the logical device storing the data designated for compression (S1607), and writes the read-out data to a region of the cache memory 62 (S1608). After this, an indication that the staging processing is complete is given as notification to the channel adapter 61 via the shared memory 64 (S1609 to S1611).

The channel adapter 61 recognizing the completion of the stage processing then, while reading out data stored in the cache memory 62 (S1612 to S1613), compresses the read out data, and writes the compressed data to another region of the cache memory 62 (S1614).

After this, channel adapter 61 then updates the LDEV-VDEV allocation table 500 and the LDEV management table 600 stored in the shared memory 64 (S1615). The processing of S1612 to S1615 is the same as the processing described above in S1310 to S1313 of FIG. 13.

The channel adapter 61 is then able to acquire the size for after compression of the stored data immediately without performing compression at the logical device LDEV by referring to the LDEV-VDEV allocation table 500 stored in the shared memory 64. As described above, this is trial compression processing carried out on this data at the time of a write request from the host computer 3, with the results being written to the LDEV-VDEV allocation table 500.

Further, the data compressed in the cache memory 62 is then destaged at the disk drives 5 based on another write request of as the result of the passage of a predetermined period of time. In this example, the channel adapter 61 carries out the destaging request at the same time as updating processing for the table (S1616). The disk adapter 63, receiving the destaging request as a result of referring to the shared memory 64, then reads out the compressed data from the cache memory 62 (S1617 to S1620), and stores the read out data in the logical device LDEV (S1621).

The processing of S1602 to S1621 is then repeated until all of the logical devices LDEV receiving the compression instruction perform compression.

Figure 17:
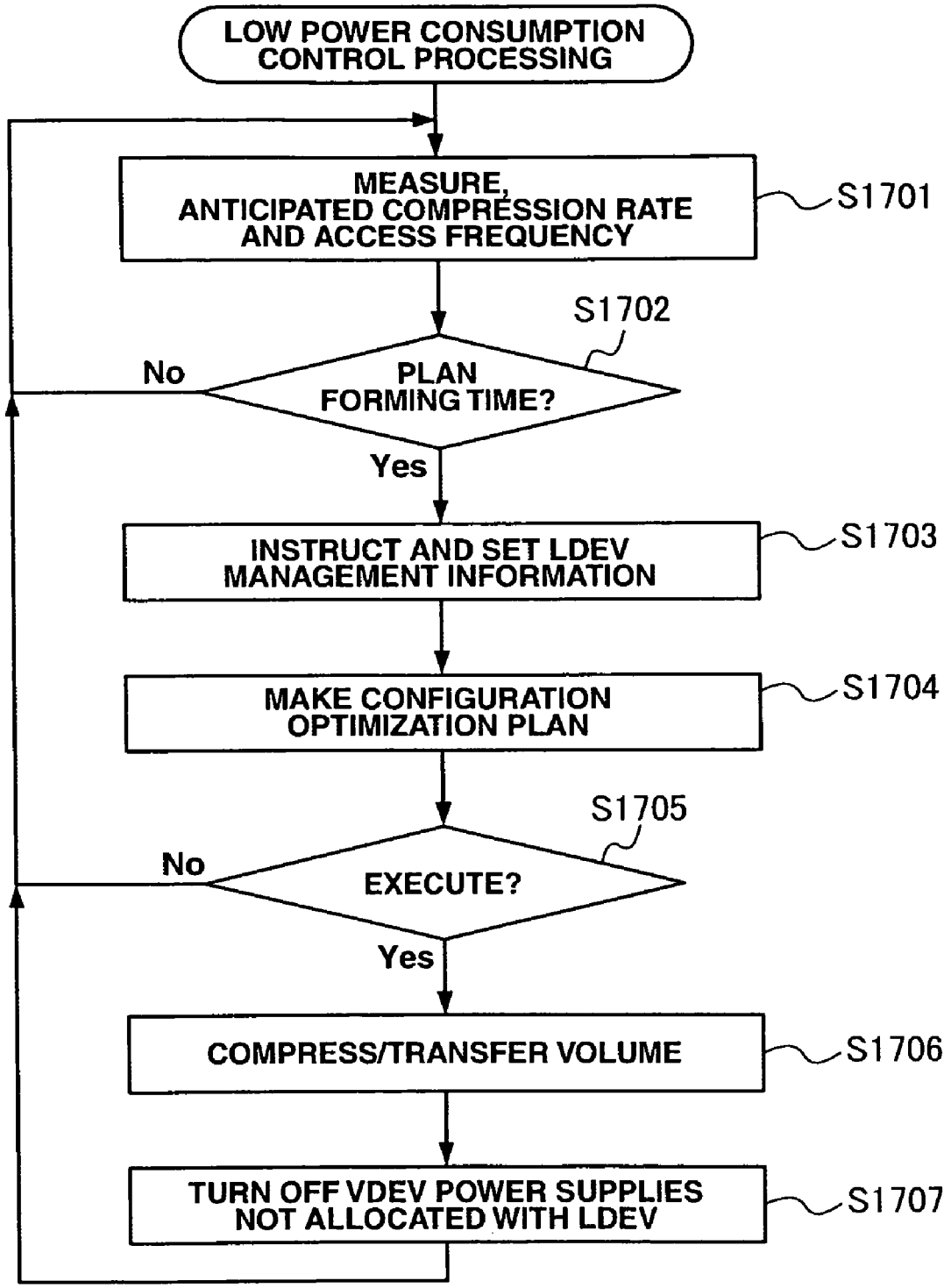
FIG. 17 is a flowchart illustrating an outline of low power consumption control processing of the storage system of an embodiment of the present invention.

FIG. 17 illustrates an outline of low power consumption control processing of the storage system 4 of an embodiment of the present invention.

Referring to FIG. 17, the service processor 66 monitors and collects statistical information such as the anticipated compression rate and access frequency etc. for each logical device LDEV during operation of the storage system 4 (S1701). When a predetermined plan making time (for example, every one week) is reached (S1702, Yes), the management terminal 8 instructs the system administrator of management information for the logical device LDEV containing statistical information collected by the service processor 66 (S1703). Alternatively, the system administrator operating the management terminal 8 may then confirm management information of the logical device LDEV containing the statistical information collected by the service processor 66 at an appropriate timing on a screen of the management terminal 8.

The system administrator then carries out setting of each logical device LDEV via the screen of the management terminal 8, and instructs the service processor 66 to create a configuration optimization plan. Upon this, the service processor 66 executes a configuration optimization plan creating program, and makes the configuration optimization plan in accordance with the set contents (S1704). The management terminal 8 then displays the configuration optimization plan made by the service processor 66 on the screen, and prompts the system administrator to approve whether or not to execute the configuration optimization processing (S1705).

When an instruction to execute configuration optimization processing is given by the system administrator operating the management terminal 8, the service processor 66 executes configuration optimization processing, i.e. compresses the designated logical device LDEV in accordance with the produced configuration optimization plan, and reallocates the logical device LDEV compressed at the virtual device VDEV (S1706). After this, the service processor 66 stops supply of power of the power supply to surplus virtual devices VDEV that are not allocated with logical devices LDEV (S1707). As a result, it is possible to reduce the power consumed by the storage system 4.

FIG. 18 illustrates an example of a screen on the management terminal 8 of the first embodiment of the present invention. Specifically, in FIG. 18 shown is an LDEV management window displayed on the screen of the management terminal 8. The system administrator then confirms the state of the storage system 4 via the LDEV management window, and is capable of carrying out settings in order to reduce power consumption. The management terminal 8 then acquires the LDEV management table stored in the shared memory 64 via the service processor 66 of the disk controller 6 and configures an LDEV management window 1800.

The LDEV management window 1800 comprises an LDEV number column 1801, compression mode column 1802, state column 1803, logical capacity column 1804, estimated capacity after compression column 1805, and access frequency column 1806, and is further provided with a configuration optimization execution button 1807.

LDEV column 1801 is an identification number for a logical device LDEV. The compression mode column 1802 indicates a compression mode currently set for this logical device LDEV. The system administrator then operates a pull-down menu, and is able to change the current compression mode. For example, the system administrator can select any one of "automatic," "compressed," and "uncompressed." With "automatic," the storage system 4 compresses the data of this logical device LDEV in accordance with predetermined conditions using configuration optimization processing, and the compressed data is arranged on a predetermined virtual device VDEV in such a manner as to contribute to reduction in the power consumed. "Compression" is the uniform compression of data of the set logical device LDEV. "Uncompressed" is a mode selected in cases where compression results cannot be anticipated in compression processing using the storage system 4 such as with logical devices LDEV for storing data compressed by, for example, an application of the host computer 3, or in cases where it is wished to make system performance a priority. Logical devices LDEV where "uncompressed" is selected are excluded as candidates to be subjected to compression for configuration optimization.

The state column 1803 indicates the state of this logical device LDEV. States of the logical device LDEV where "compressed" or "uncompressed" are selected are compatible with compression mode as is but the state of the logical devices LDEV where "automatic compression" is selected depends on the results of the configuration optimization.

The logical capacity column 1804 indicates the total capacity of the allocated virtual device VDEV, i.e., indicates the capacity of the uncompressed data that can be stored.

The estimated capacity after compression column 1805 indicates the capacity of the logical device LDEV for the case of applying compression to this logical device LDEV. The compressed logical device LDEV matches with the actual capacity. The estimated capacity after compression is the capacity deemed to be necessary in the case of (at times other than the time of formatting) writing all of the storage regions of the logical devices LDEV using data having the same information entropy as data already written, with the capacity of a margin region for writing use added. In this embodiment, it is taken that the margin region for writing use is considered. In the table for usage of VDEV described in the following, as-yet unused regions of the regions of the virtual devices VDEV that can be allocated to logical devices LDEV corresponding to margin regions for write use. Further, as a method for obtaining the estimated capacity after compression in a straightforward manner, for example, taking the capacity when data already written is uncompressed to be x, the logical capacity to be w, and the capacity after compressing of data already written to be y, the estimated capacity after compression can be obtained using the following equation:

$$z = wy/x.$$

The access frequency column 1806 shows the access frequency for this logical device LDEV. In this example, the number of accesses (IOPS) per one second is shown. The compression mode of this logical device can be selected while considering the access frequency.

Figure 19:
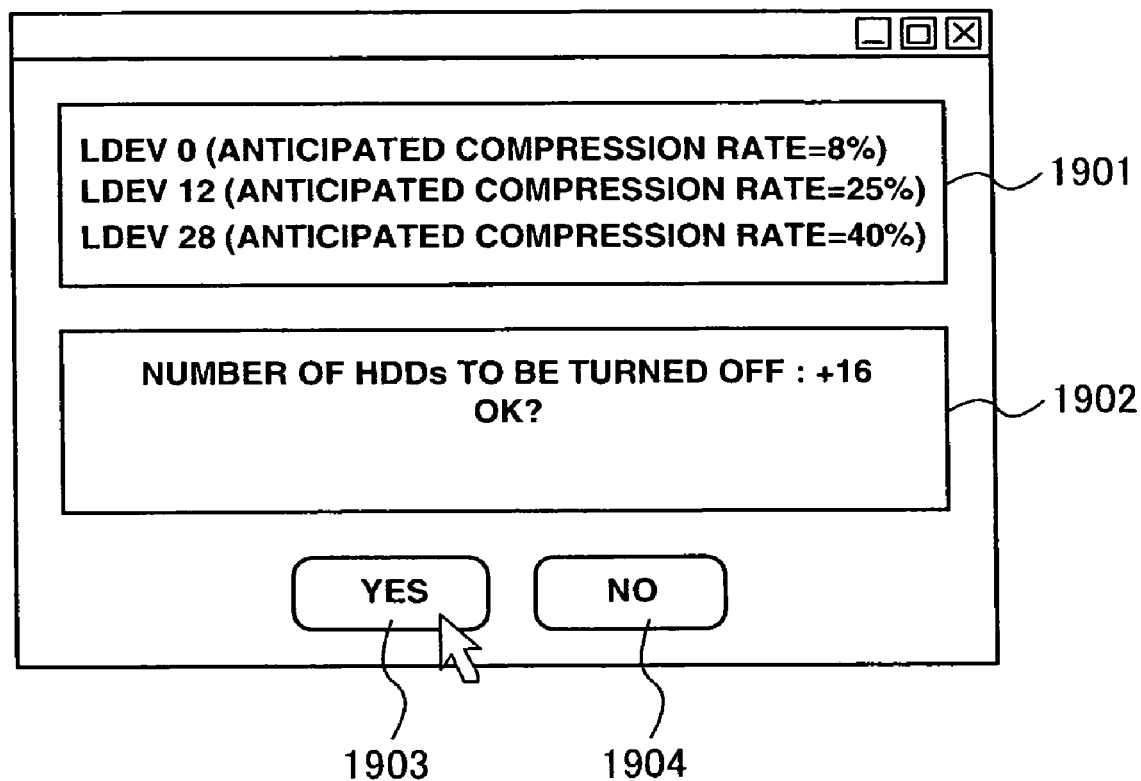
FIG. 19 illustrates an example of a screen on the management terminal of an embodiment of the present invention.

A configuration optimization execution button 1807 is a button for instructing execution of configuration optimization based on the setting content of the LDEV management window. When the configuration optimization execution button 1807 is pressed, the management terminal 8 executes optimization estimation processing described in the following, a confirmation dialogue box 1900 is displayed as shown in FIG. 19, and approval of permission or denial of configuration optimization execution is obtained from the system administrator.

Specifically, the confirmation dialogue 1900 comprises a predicted compression rate display region 1901, VDEV display region 1902, approval button 1903, and deny button 1904. The number of logical devices LDEV recommended for compression and the predicted compression rate are displayed at the predicted compression rate display region 1901. As a result, it is possible for the system administrator to be aware of logical devices LDEV for which the predicted compression rate is high in advance, and it is possible to prevent compression of logical devices LDEV that influence system performance as a result of the compression/decompression overhead.

The VDEV display region 1902 displays a virtual VDEV for use after compression processing is carried out, and displays the number of disk drives 5 not in use that can have their power supply turned off.

Taking the displayed contents into consideration, the system administrator then presses the approval button 1903 in the event of approving execution of configuration optimization, and presses the deny button 1904 in the event that approval is not given.

Figure 20:
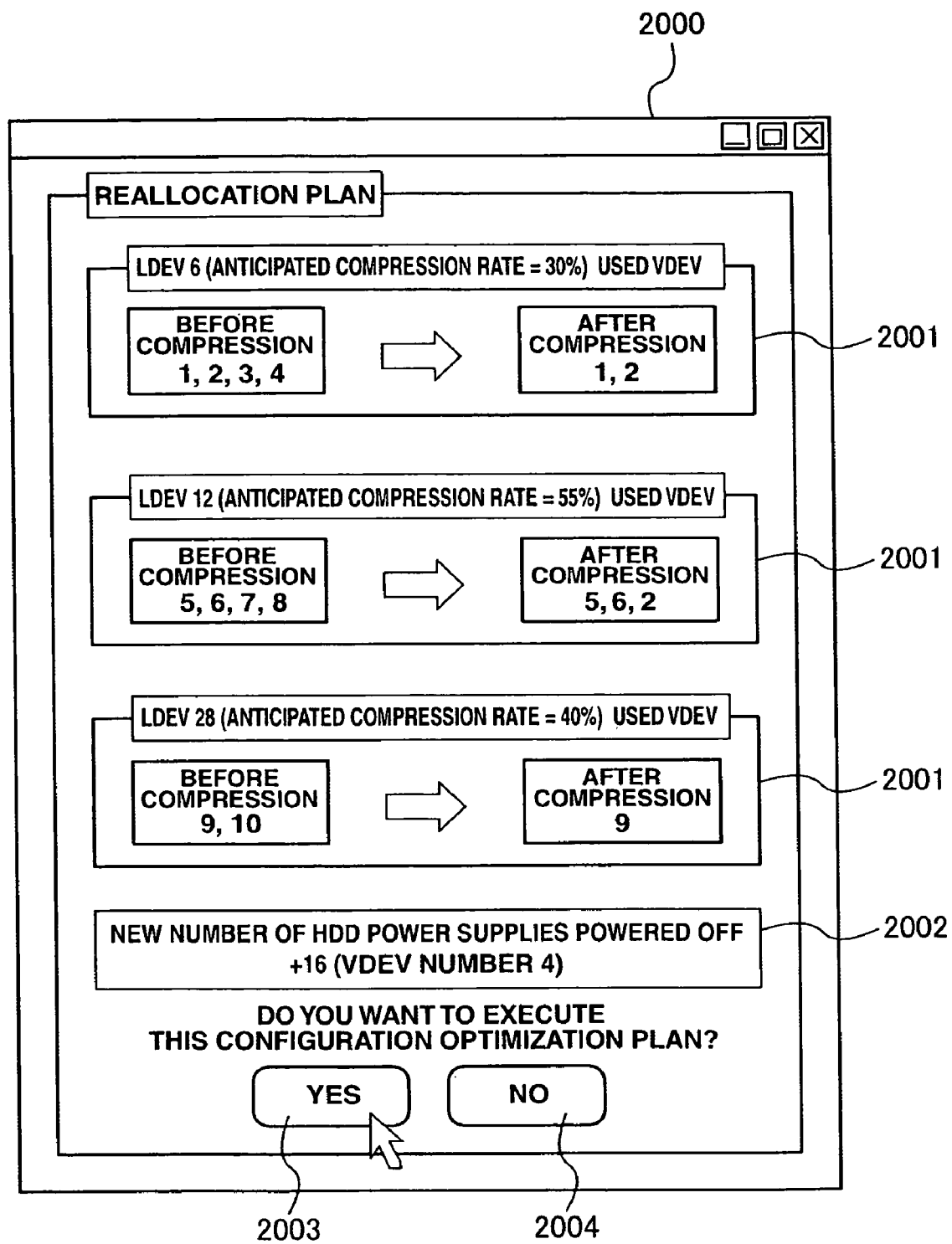
FIG. 20 illustrates an example of a screen on the management terminal of an embodiment of the present invention.

Further, it is also possible to display a relocation plan dialogue box 2000 as shown in FIG. 20 in place of the confirmation dialogue box 1900 shown in FIG. 19. The relocation plan dialogue box 2000 contains a compression target logical device display region 2001. The compression target logical device display region 2001 displays used virtual devices VDEV in a manner correlating to the logical devices LDEV constituting targets of compression. Further, a newly powered off disk drive number display region 2002 displays the number of disk drives 5 for which the power supply has been newly stopped using a configuration optimization plan. Taking the displayed contents into consideration, similarly, the system administrator then presses the approval button 2003 in the event of approving execution of configuration optimization, and presses the deny button 2004 in the event that approval is not given.

Figure 21:
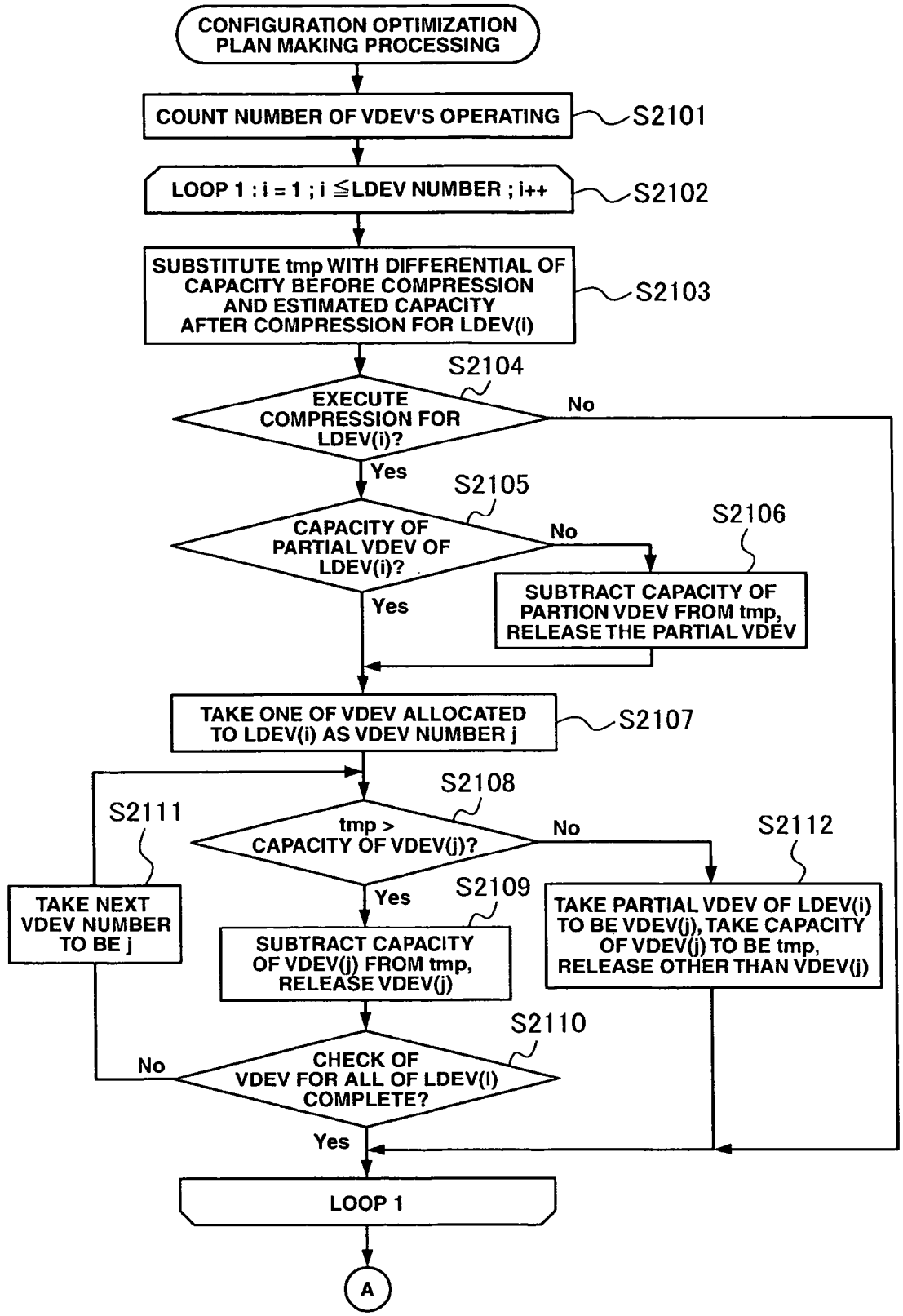
FIG. 21 is a flowchart illustrating configuration optimization processing of the storage system of an embodiment of the present invention.

FIG. 21 and FIG. 22 illustrate configuration optimization processing of the storage system 4 of an embodiment of the present invention. This configuration optimization plan producing processing is, for example, executed by a service processor 66 receiving instructions from a management terminal 8.

This configuration optimization plan producing processing is generally composed of processing for making a plan for releasing virtual devices VDEV in accompaniment with compression of data size due to compression processing (FIG. 21) and processing for making a plan consolidating partial virtual devices to the minimum number of virtual devices (FIG. 22).

The service processor 66 receiving instructions to execute configuration optimization processing from the management terminal 8 first counts the number of virtual devices VDEV currently operating (S2101). Next, the service processor 66 then sets a variable i constituting an index to zero in order to refer to the order of each logical device LDEV. The service processor 66 the repeats this processing for all of the logical devices LDEV until planning of releasing of the virtual devices VDEV is achieved (S2102).

The service processor 66 then refers to the logical capacity column 604 of the LDEV management table and the estimated capacity after compression column 605 for logical device LDEV(i), and substitutes a differential value for the capacity before compression (logical capacity) and the estimated capacity after compression in the variable tmp.

Next, the service processor 66 determines whether or not to execute compression for the logical device LDEV(i) (S2104). The service processor 66 determines to execute compression in the event that compression attributes are provided for the logical device LDEV and the anticipated compression rate is less than a predetermined reference value. This is because the size of the data after compression is larger than the size of the original data according to the content of the data that is the target of compression and the compression algorithm. On the other hand, when the logical device LDEV(i), and in the event that the uncompressed attribute of the logical device LDEV(i) is provided, the service processor 66 does not execute compression for the logical device LDEV(i), and processing is carried out on the next logical device LDEV(i+1).

In addition to the estimated compression rate, the service processor 66 may also determine whether or not to execute compression using the access frequency 603.

Specifically, the case is considered where the storage range data accesses are requested for spans a broad width, and data on the cache memory 62 cannot be re-utilized. In this event, the number of disk drives 5 allocated to a logical device LDEV is required to be large for the maximum performance. For example, the maximum performance for a logical device LDEV constituted using 64 disk drives 5 of a maximum performance of 150 IOPS is 150×64=9600 IOPS. In the event that the estimated compression rate for this logical device LDEV is taken to be 25% (i.e. the data length is ¼) and the performance due to the overhead of the compression processing falls to 75% of that at the time of no compression, then the maximum performance after compression is 150×(64×0.25)× 0.75=1800 IOPS. Here, "64×0.25" indicates the number of disk drives 5 used after compression. This shows that this logical device LDEV is capable of processing accesses up to 1800 times or less per second. The service processor 66 then determines whether or not to carry out compression using a value obtained in this manner as a predetermined threshold value.

Determination as to whether or not to execute compression may also simply use just the compression rate or use the access frequency. In the case of using the access frequency, it is also possible, for example, to set the threshold value to a small value such as, for example, 10 IOPS meaning that there are almost no accesses taking place.

When it is determined to execute compression, the service processor 66 further determines whether or not the variable tmp is larger than the capacity (fragment capacity) of the partial virtual devices of the logical device LDEV(i) (S2105). When it is determined that the variable tmp is larger than the fragment capacity, the service processor 66 subtracts the fragment capacity from the variable tmp, and a plan is made to release the partial virtual device of the logical device LDEV (i) (S2106). When the variable tmp is not larger than the fragment capacity, the service processor 66 proceeds to S2107 without releasing this partial virtual device.

The service processor 66 then sets the virtual device VDEV allocated to the logical device LDEV(i) to the variable j in order to refer to the order (S2107), and determines whether or not the variable tmp is larger than the capacity of the virtual device VDEV(j) (S2108). When it is determined that the variable tmp is larger than the capacity of the virtual device VDEV(j), the service processor 66 subtracts this portion of the capacity of virtual device VDEV(j) from the variable tmp, and a plan is made to release the virtual device VDEV(j) (S2109). The service processor 66 then determines whether or not processing has been carried out for all of the other virtual devices VDEV allocated to the logical device LDEV (i), and if this is not yet the case, processing is similarly carried out (S2110 and S2111). In this way, the service processor 66 estimates that the data size becomes smaller by carrying out this compression processing, and virtual devices VDEV that are no longer required for use can be released in order.

On the other hand, in S2108, when it is determined that the variable tmp is not larger than the capacity of the virtual device VDEV(j), the service processor 66 allocates the virtual device VDEV(j) as a partial virtual device for the logical device LDEV(i), the value of the variable tmp is set as the fragment capacity of the virtual device VDEV(i), and portions other than the partial virtual device of the virtual device VDEV(j) are released (S2112).

When the value of the variable i is taken to be one segment, and the variable i is not larger than the number of logical device LDEV, the service processor 66 returns to the processing of S2103 (S2112). Where all of the logical devices have been processed, the service processor 66 proceeds to the next step.

In the processing described below, the service processor 66 makes a plan indicating that the number of virtual devices VDEV that have to operate is made as small as possible in a manner of allocating partial virtual devices in a plurality of logical devices to one virtual device VDEV.

The service processor 66 substitutes the LDEV number for an array integer sL[x] (where x is a natural number from one to a number of logical devices LDEV) indicating the order of the logical devices LDEV referred to in such a manner that the fragment capacity is in descending order. This is in order to make the data that is the target of transfer small at the time of executing a produced configuration optimization plan.

The service processor 66 then sets all of the elements for an array integer moved [x] to "false" (S2202). The array integer moved [x] is a flag variable indicating whether or not all of the processes have been carried out. In order to refer to the logical devices LDEV in order, the service processor sets a variable i indicating the index of an array variable sL currently referred to 0 (S2203).

Subsequently, the service processor 66 checks the array variable moved [sL[i]], and determines whether or not all of the logical devices LDEV currently being referred to have been processed (S2204). In the event that the array variable moved [sL[i]] is not false, the processing of S2205 is proceeded to. On the other hand, in the event that the array integer moved [sL[i]] is False, the LDEV number is set to the index j in order to investigate which partial virtual device of which logical device LDEV the partial virtual device of this logical device LDEV is allocated to (S2205). As described above, the logical devices LDEV are lined up in descending order in accordance with fractional capacity at the array integer sL[x]. Accordingly, the logical device LDEV of the smallest fragment capacity is selected in turn, thereby allowing data migration to be minimized.

The service processor 66 then determines whether or not the unallocated capacity of the partial virtual devices of the logical device LDEV(sL[i]) is larger than the fragment capacity of the logical device LDEV(sL[j]), with the array variable moved [sL[i]] at false (S2206). When processing has already been carried out or when the capacity is large, it is not possible to allocate the partial virtual device, and processing is then carried out for the logical device LDEV(sL[j−1]) having a fragment capacity of the next size. In contrast, when the unallocated capacity of the partial virtual devices of logical device LDEV(sL[i]) is larger than the fragment capacity of the logical device LDEV(sL[j], with an array variable moved [sL[i]] of false, the service processor 66 releases the partial virtual devices of the logical device LDEV(sL[j]), and makes a plan for this partial virtual device to be allocated to the same virtual device VDEV as for the partial virtual devices of the of the logical device LDEV(sL[i]) (S2207). The service processor 66 then puts the value of the array variable moved [sL[j]] to true in order to display that all of the logical devices LDEV(sL[i]) are processed (S2208). In this way, the service processor carries out processing to put the logical devices LDEV in order of largest fragment capacity of partial virtual devices.

When processing is carried out for all of the logical devices LDEV, the service processor 66 counts the number of virtual devices VDEV operating in the case of executing a made plan (S2124), and processing is complete.

The service processor 66 then calculates the number of virtual devices VDEV it is possible to stop the power supply for based on the number of virtual devices VDEV operating that are initially counted and the number of virtual devices it is intended to operate obtained from the configuration optimization plan. Further, the service processor 66 calculates the number of disk drives 5 the supply of power is to be newly stopped for based on the number of disk drives 5 constituting the virtual devices VDEV obtained from the system configuration information.

Upon finishing making the optimum configuration plan, the service processor 66 notifies the management terminal 8, the management terminal 8 instructs the system administrator with the dialogue box shown in FIG. 19 and FIG. 20, and confirmation is obtained as to whether it is possible to execute the optimum configuration plan. When the system administrator approves execution of the optimum configuration plan, the disk controller 6, under the control of the service processor 66, starts releasing of the virtual devices VDEV etc., transfer of the data, and compression processing etc. in accordance with the created optimization configuration plan.

The embodiment described above shows an example for illustrating the present invention, and the content of the present invention is by no means limited to these embodiments. The present invention can be realized using various forms within the essential scope of the present invention.

For example, in the above embodiments, the compression/decompression unit is provided within the channel adapter but this is by no means limiting. The compression/decompression may also be provided as an independent module within the disk controller.

Further, the storage system 4 may also encrypt received data for storing in a disk drive 5. In this case, it is preferable to compress this data before data encryption from the point of view of an effective compression rate. In order to cope with this, for example, an encryption (and decryption) engine is mounted at the channel protocol processor 613 of the disk control unit.

The present invention is capable of being broadly utilized at storage system 1 equipped with a plurality of disk drives.

What is claimed is:

1. A storage system having a plurality of disk drives and a disk controller for controlling the plurality of disk drives, with a logical device being allocated to a plurality of virtual devices configured from the plurality of disk drives, the disk controller comprising:
    a channel adapter configured to connect a host computer via a channel;
    a disk adapter configured to access a predetermined storage region of the logical device;
    a cache memory configured to transmit and receive data between the channel adapter and the disk adapter;
    a compression unit configured to carry out compression processing on the data;
    a power control unit configured to control power supplied to the plurality of disk drives,
    wherein the disk controller forms a logical device after a trial compression based on data compressed by the compression processing, and allocates the logical device after the trial compression to at least one of the plurality of virtual devices,
    wherein the power control unit is configured to stop the power supplied to disk drives of the plurality of disk drives which are configuring virtual devices to which the logical device is no longer allocated after the trial compression; and
    a service processor configured to:
        estimate, prior to compression being executed on a logical device, an estimated performance of the logical device after compression;
        compare the estimated performance with an access frequency of the logical device; and
        determine whether or not to execute compression for the logical device based on the comparison of the estimated performance with the access frequency of the logical device.

2. The storage system according to claim 1, wherein at least one of the plurality of virtual devices is allocated with a logical device based on uncompressed data and a logical device after trial compression based on compressed data.

3. The storage system according to claim 1, wherein the compression unit calculates compression rate based on the compressed data compressed in the trial compression.

4. The storage system according to claim 3, wherein the compression unit reads out, compresses, and stores in cache memory, data stored in the cache memory based on the calculated compression rate.

5. The storage system according to claim 1, wherein the disk controller stores the compressed data in a predetermined storage region of the logical device after trial compression.

6. The storage system according to claim 1, wherein the compression unit compresses data received by the channel adapter.

7. A method of controlling storage system having a plurality of disk drives and a disk controller for controlling the plurality of disk drives, comprising:
    configuring a plurality of virtual devices allocated with at least one disk drive;
    allocating logical devices for before compression for supplying regions for storing data to the host computer to a first group of virtual devices of a first predetermined number;
    receiving data in accordance with write requests from the host computer;
    performing compression processing on the received data;
    allocating logical devices for after compression formed based on data compressed by the compression processing in a trial compression to a second group of virtual devices of a second predetermined number that is lower than the first predetermined number;
    controlling the supply of power to stop power to virtual devices other than the second group of virtual devices of the second predetermined number;
    receiving a plurality of write requests for the logical device for before compression from the host computer;
    calculating access frequency with respect to the logical device for before compression based on the plurality of write requests;
    estimating, prior to compression being executed on the logical device, an estimated performance of the logical device after compression;
    comparing the estimated performance with the access frequency of the logical device; and
    determining whether or not to execute compression for the logical device based on the comparison of the estimated performance with the access frequency of the logical device.

8. The method according to claim 7, further comprising storing the compressed data in a predetermined storage region of the logical device for after compression.

9. The method according to claim 7, wherein the trial compression includes calculating compression rate based on the compressed data.

10. The method according to claim 9, wherein the logical device for after compression is allocated to the second virtual devices configured using the second predetermined number based on the calculated compression rate.

11. The method according to claim 9, further comprising storing the received data in cache memory, wherein the compression processing includes reading out and compressing the received data stored in the cache memory when the calculated compression rate falls below a predetermined threshold value.

12. The method according to claim 11, further comprising restoring data compressed by the compression processing in the cache memory.

13. The method according to claim 11, further comprising storing received data stored in the cache memory in the logical devices for before compression when the calculated compression rate does not fall below a predetermined threshold value.

14. The method according to claim 9, further comprising:
storing the received data in cache memory; and
storing the received data stored in the cache memory in a predetermined storage region of the logical device for before compression,
wherein the first logical device is set with an uncompressed attribute.

15. The method according to claim 14, further comprising:
setting the logical device for before compression to a compression attribute;
reading out data stored in the logical device for before compression;
performing compression processing in the trial compression on the read data;
allocating logical devices for after compression formed based on data compressed by the compression processing to the second group of virtual devices of the second predetermined number that is lower than the first predetermined number;
storing the compressed data in a predetermined storage region of the logical device for after the compression; and
controlling the supply of power to stop power to virtual devices other than the group of virtual devices of the second predetermined number.

16. The method according to claim 14, further comprising:
providing management information associated with the calculated compression rate for the logical devices for before the compression; and
determining whether or not compression processing is carried out on the data stored in a predetermined storage region on the logical device before compression based on the held management information.

17. The control method according to claim 9
wherein the logical device for after compression is allocated to the group of virtual devices of the second predetermined number based on the calculated access frequency.

18. The control method according to claim 9, further comprising the steps of:
calculating a differential value for the capacity of a logical device before compression and the logical device after compression; and
releasing virtual devices of the first group of virtual devices of the first predetermined number where the logical devices for before the compression are only partially allocated, in order to enable release from the second group of virtual devices of the second predetermined number based on the calculated differential value.

19. A method of controlling storage system having a plurality of disk drives and a disk controller for controlling the plurality of disk drives, comprising the steps of:
configuring a plurality of virtual devices allocated with at least one disk drive;
allocating logical devices for before compression for supplying storage regions for data to the host computer to a first group of virtual devices of a first predetermined number;
reading out data stored in the first logical device;
performing compression processing in a trial compression on the read data;
allocating logical devices after compression formed based on data compressed by the compression processing in the trial compression to a second group of virtual devices of a second predetermined number that is lower than the first predetermined number;
controlling the supply of power to stop power to virtual devices other than the second group of virtual devices of the second predetermined number;
receiving a plurality of write requests for the logical device for before compression from the host computer;
calculating access frequency with respect to the logical device for before compression based on the plurality of write requests;
estimating, prior to compression being executed on the logical device, an estimated performance of the logical device after compression;
comparing the estimated performance with the access frequency of the logical device; and
determining whether or not to execute compression for the logical device based on the comparison of the estimated performance with the access frequency of the logical device.

* * * * *